US012400443B2

United States Patent
Brockers et al.

(10) Patent No.: US 12,400,443 B2
(45) Date of Patent: Aug. 26, 2025

(54) UNMANNED AERIAL SYSTEM (UAS) AUTONOMOUS TERRAIN MAPPING AND LANDING SITE DETECTION

(71) Applicant: California Institute of Technology, Pasadena, CA (US)

(72) Inventors: Roland Brockers, Pasadena, CA (US); Pedro Duarte Lopes Mascarenhas Proença, Pasadena, CA (US); Pascal Schoppmann, Pasadena, CA (US); Matthias Domnik, Pasadena, CA (US); Jeff H. Delaune, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 452 days.

(21) Appl. No.: 17/740,101

(22) Filed: May 9, 2022

(65) Prior Publication Data

US 2023/0245444 A1 Aug. 3, 2023

Related U.S. Application Data

(60) Provisional application No. 63/338,754, filed on May 5, 2022, provisional application No. 63/185,601, filed on May 7, 2021.

(51) Int. Cl.
*G06V 20/17* (2022.01)
*B64D 45/04* (2006.01)
(Continued)

(52) U.S. Cl.
CPC ............ *G06V 20/17* (2022.01); *B64D 45/04* (2013.01); *B64U 10/13* (2023.01); *G01S 19/47* (2013.01);
(Continued)

(58) Field of Classification Search
CPC ... B64C 39/024; B64U 2101/30; G01S 19/47; G01S 19/485; G06T 15/00; G06T 17/05;
(Continued)

(56) References Cited

U.S. PATENT DOCUMENTS 7,154,507 B1 * 12/2006 Moreton ................. G06T 15/04
345/582
10,239,638 B1 * 3/2019 Cohen ..................... B64F 1/025
(Continued)

OTHER PUBLICATIONS

Balaram, J., et al., "Mars Helicopter Technology Demonstrator", AIAA SciTech Forum, 2018 AIAA Atmospheric Flight Mechanics Conference, Jan. 2018, pp. 1-18.
(Continued)

*Primary Examiner* — Peter D Le
(74) *Attorney, Agent, or Firm* — Gates & Cooper LLP

(57) ABSTRACT

A method, system, and apparatus for an unmanned aerial vehicle (UAV) to autonomously reconstruct overflown terrain and detect safe landing sites. A UAV autonomously acquires on-board pose estimates from an on-board visual-inertial-range odometry method during flight. The on-board pose estimates are utilized as a pose prior and to regain metric scale during three-dimensional (3D) reconstruction. The on-board pose estimates are corrected based on a bundle adjustment approach using previously acquired images. 3D reconstruction is performed based on multiple captured images taken from an on-board camera. Range data from the multiple captured images is fused into a multi-resolution height map. A safe landing site on the terrain is detected based on the multi-resolution height map.

26 Claims, 12 Drawing Sheets

(51) Int. Cl.
| | |
|---|---|
| B64U 10/13 | (2023.01) |
| G01S 19/47 | (2010.01) |
| G01S 19/48 | (2010.01) |
| G06T 15/00 | (2011.01) |
| G06T 17/05 | (2011.01) |
| G06V 10/80 | (2022.01) |
| B64U 101/30 | (2023.01) |

(52) U.S. Cl.
CPC ............ *G01S 19/485* (2020.05); *G06T 15/00* (2013.01); *G06T 17/05* (2013.01); *G06V 10/803* (2022.01); *B64U 2101/30* (2023.01); *G06T 2200/08* (2013.01); *G06T 2210/36* (2013.01)

(58) Field of Classification Search
CPC . G06T 2200/08; G06T 2210/36; G06V 10/25; G06V 10/803; G06V 20/17; B64D 45/04
See application file for complete search history.

(56) References Cited

U.S. PATENT DOCUMENTS

| | | | | |
|---|---|---|---|---|
| 2009/0002220 | A1* | 1/2009 | Lovberg | G01S 13/935 342/33 |
| 2012/0141026 | A1* | 6/2012 | Yoon | G06T 9/00 382/167 |
| 2013/0093852 | A1* | 4/2013 | Ye | A61H 3/068 348/46 |
| 2013/0169629 | A1* | 7/2013 | Shin | G06T 17/05 345/419 |
| 2018/0031387 | A1* | 2/2018 | Scherer | G06T 7/579 |
| 2019/0066522 | A1* | 2/2019 | Sweet, III | G08G 5/0086 |
| 2022/0383484 | A1* | 12/2022 | He | G06T 7/70 |

OTHER PUBLICATIONS

Johnson, W., et al., "Mars Science Helicopter Conceptual Design", National Aeronautics and Space Administration, AIAA Ascend, Mar. 2020, pp. 1-53.
Bayard, D.S., et al., "Vision-Based Navigation for the NASA Mars Helicopter", AIAA SciTech Forum, Jan. 2019, pp. 1-22.
Saripalli, S., et al., "Vision-based Autonomous Landing of an Unmanned Aerial Vehicle", Proceedings of the 2002 IEEE International Conference on Robotics Automation, May 2002, pp. 2799-2804, vol. 3.
Falanga, D., et al., "Vision-based Autonomous Quadrotor Landing on a Moving Platform", 2017 IEEE International Symposium on Safety, Security and Rescue Robotics (SSRR), 2017, pp. 200-207.
Bosch, S., et al., "Autonomous detection of safe landing areas for an UAV from monocular images", 2006 IEEE/RSJ International Conference on Intelligent Robots and Systems, 2006, pp. 5522-5527.
Brockers, R., et al., "Autonomous landing and ingress of micro-air-vehicles in urban environments based on monocular vision", Proceedings of the SPIE, Jun. 2011, pp. 1-12, vol. 8031.
Desaraju, V.R., et al., "Vision-based Landing Site Evaluation and Trajectory Generation Toward Rooftop Landing", Autonomous Robots, Oct. 2015, pp. 445-463, vol. 39, Issue 3.
Brockers, R., et al., "Towards autonomous navigation of miniature UAV", IEEE Conference on Computer Vision and Pattern Recognition Workshops, 2014, pp. 631-637.
Trawny, N., et al., "Flight testing a Real-Time Hazard Detection System for Safe Lunar Landing on the Rocket-Powered Morpheus Vehicle", AIAA Guidance, Navigation, and Control Conference, Jan. 2015, pp. 1-14.
Luna, M.E., et al., "Evaluation of the Simple Safe Site Selection (S4) Hazard Detection Algorithm using Helicopter Field Test Data", AIAA Guidance, Navigation, and Control Conference, Jan. 2017, pp. 1-14.
Johnson, A., et al., "Lidar-based Hazard Avoidance for Safe Landing on Mars", Journal of Guidance, Control, and Dynamics, Nov. 2002, pp. 1-10, vol. 25, No. 5.
Scherer, S., et al., "Autonomous landing at unprepared sites by a full-scale helicopter", Robotics and Autonomous Systems, 2012, pp. 1545-1562, vol. 60.
Johnson, A., et al., "The Mars 2020 Lander Vision System Field Test", Proc. AAS Guidance Navigation and Control Conference (AAS-20-105), 2020, pp. 1-13.
Johnson, A., et al., Vision Guided Landing of an Autonomous Helicopter in Hazardous Terrain, Proceedings of the 2005 IEEE International Conference on Robotics and Automation, Apr. 2005, pp. 3966-3971.
Fankhauser, P., et al., "Robot-Centric Elevation Mapping With Uncertainty Estimates", International Conference on Climbing and Walking Robots (CLAWAR), 2014, pp. 1-8.
Forster, C., et al., "Continuous On-Board Monocular-Vision-based Elevation Mapping Applied to Autonomous anding of Micro Aerial Vehicles", IEEE International Conference on Robotics and Automation (ICRA), 2015, pp. 1-8.
Daftry, S., et al., "Robust Vision-based Autonomous Navigation, Mapping and Landing for MAVs at Night", International Symposium on Experimental Robotics (ISER), 2018, pp. 1-10.
Zienkiewicz, J., et al., "Monocular, Real-Time Surface Reconstruction using Dynamic Level of Detail", Fourth International Conference on 3D Vision (3DV), 2016, pp. 37-46.
Delaune, J., et al., "Extended Navigation Capabilities for a Future Mars Science Helicopter Concept", IEEE Aerospace Conference, Mar. 2020, pp. 1-17.
Domnik, M., et al., "Dense 3D-Reconstruction from Monocular Image Sequences for Computationally Constrained UAS", IEEE Winter Conference on Applications of Computer Vision (WACV), 2021, pp. 1820-1828.
Goldberg, S.B., et al., "Stereo Vision and Rover Navigation Software for Planetary Exploration", 2002 IEEE Aerospace Conference Proceedings, Mar. 2002, pp. 1-12.
Burt, P.J., et al., "The Laplacian Pyramid as a Compact Image Code", IEEE Transactions on Communications, Apr. 1983, pp. 532-540, vol. COM-3I, No. 4.
Herbert, M., et al., "Terrain Mapping for a Roving Planetary Explorer", Proceedings of the International Conference on Robotics and Automation, 1989, pp. 997-1002.
Muser, M., et al., "Meeting the Contact-Mechanics Challenge", Tribology Letters, 2017, pp. 1-19.
Jain, A., "DARTS—Multibody Modeling, Simulation and Analysis Software", 2020, Computmethods, pp. 433-441, vol. 53.
Bapst, J., et al., "Mars Science Helicopter: Compelling Science Enabled by an Aerial Platform", National Aeronautics and Space Administration, 2020, pp. 1-8.
Grip, H.F., et al., "Flight Control System for NASA's Mars Helicopter", AIAA Scitech Forum, 2019, pp. 1-20.
Engel, J., et al., "Direct Sparse Odometry", IEEE Transactions on Pattern Analysis and Machine Intelligence, Mar. 2018, pp. 611-625, vol. 40, No. 3.
Engel, J., et al., "LSD-SLAM: Large-Scale Direct Monocular SLAM", European Conference on Computer Vision (ECCV), 2014, pp. 1-16.
Schneider, T., et al., "Maplab: An Open Framework for Research in Visual-Inertial Mapping and Localization", IEEE Robotics and Automation Letters, Jul. 2018, pp. 1418-1425, vol. 3, No. 3.
Pizzoli, M., et al., "REMODE: Probabilistic, Monocular Dense Reconstruction in Real Time", 2014 IEEE International Conference on Robotics and Automation (ICRA), 2014, pp. 2609-2616.
Proenca, P.F., et al., "Probabilistic RGB-D odometry based on points, lines and planes under depth uncertainty", Robotics and Autonomous Systems, 2018, pp. 25-39, vol. 104.
Johnson, A., et al., "The Lander Vision System for Mars 2020 Entry Descent and Landing", AAS Guidance Navigation and Control Conference, Feb. 2017, pp. 1-17.
Fankhauser, P., et al., "A Universal Grid Map Library: Implementation and Use Case for Rough Terrain Navigation", Robot Operating System (ROS), Studies in Computational Intelligence, 2016, pp. 99-120.

(56) References Cited

OTHER PUBLICATIONS

Triebel, R., et al., "Multi-Level Surface Maps for Outdoor Terrain Mapping and Loop Closing", 2006 IEEE/RSJ International Conference on Intelligent Robots and Systems, 2006, pp. 1-7.
Hinzmann, T., et al., "Free LSD: Prior-Free Visual Landing Site Detection for Autonomous Planes", IEEE Robotics and Automation Letters, Feb. 2018, pp. 2545-2552, vol. 3, No. 3.
Vasudevan, S., et al., "Gaussian Process Modeling of Large Scale Terrain", 2009 IEEE International Conference on Robotics and Automation, May 2009, pp. 1-7, vol. 26, No. 10.
Popovic, M., et al., "Multiresolution Mapping and Informative Path Planning for UAV-based Terrain Monitoring", 2017 IEEE/RSJ International Conference on Intelligent Robots and Systems, 2017, pp. 1382-1388.
Borgefors, G., "Distance Transformations in Digital Images", Computer Vision, Graphics, and Image Processing, 1986, pp. 344-371, vol. 34.
Shah, S., et al., "AirSim: High-Fidelity Visual and Physical Simulation for Autonomous Vehicles", Field and Service Robotics, 2018, pp. 621-635.
Warren, M., et al., "Enabling Aircraft Emergency Landings Using Active Visual Site Detection", Field and Service Robotics, 2015, pp. 167-181, vol. 105.

\* cited by examiner

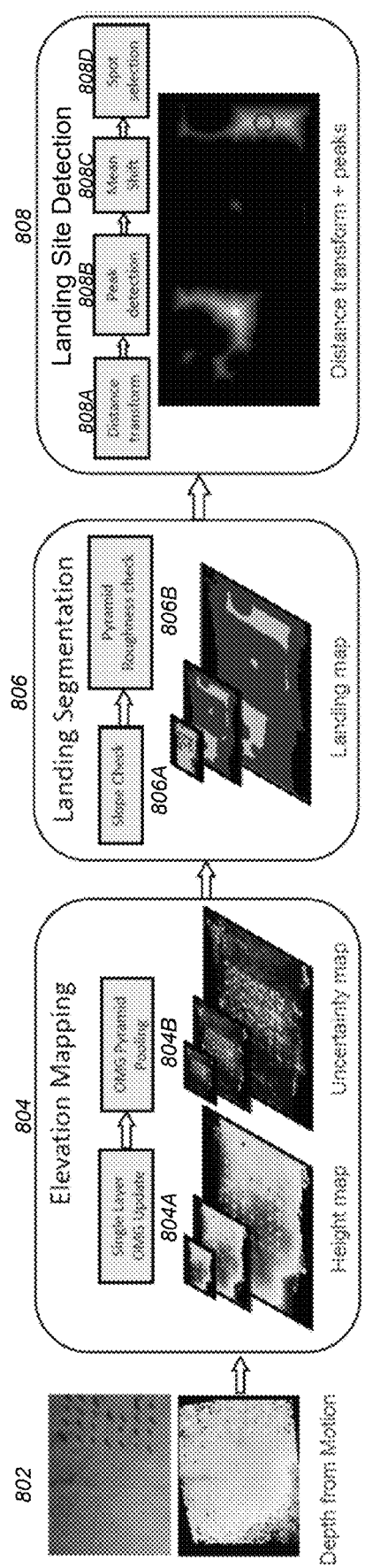
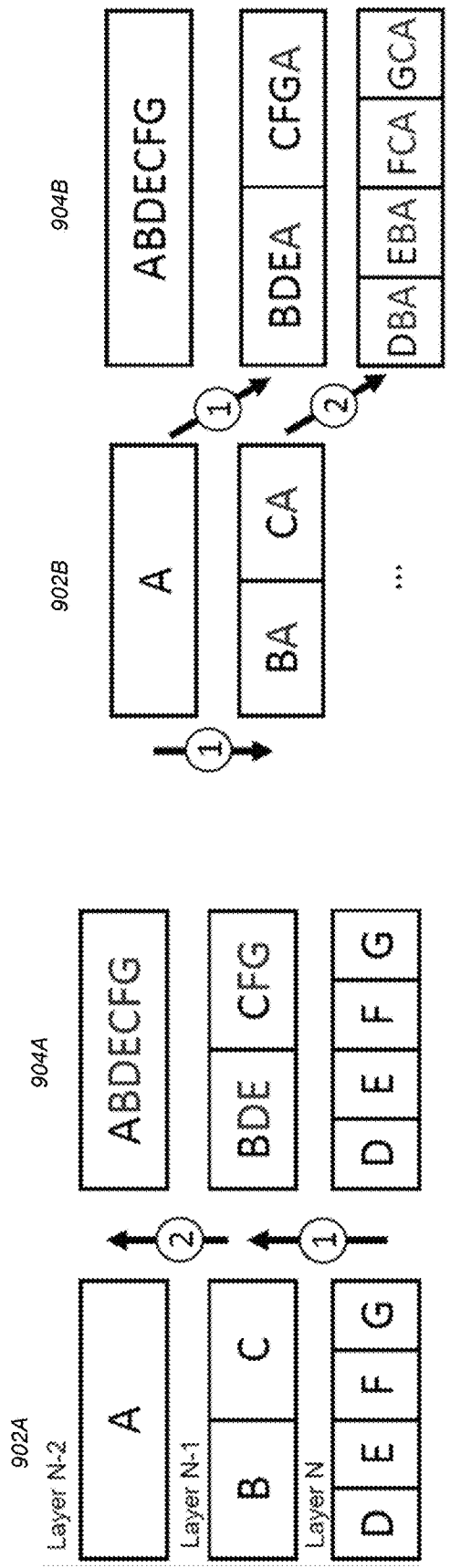
FIG. 8
FIG. 9A
FIG. 9B

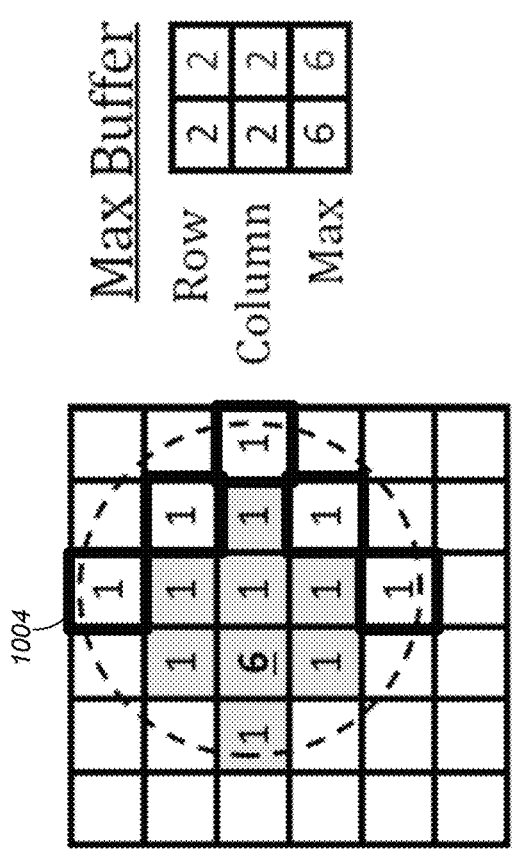
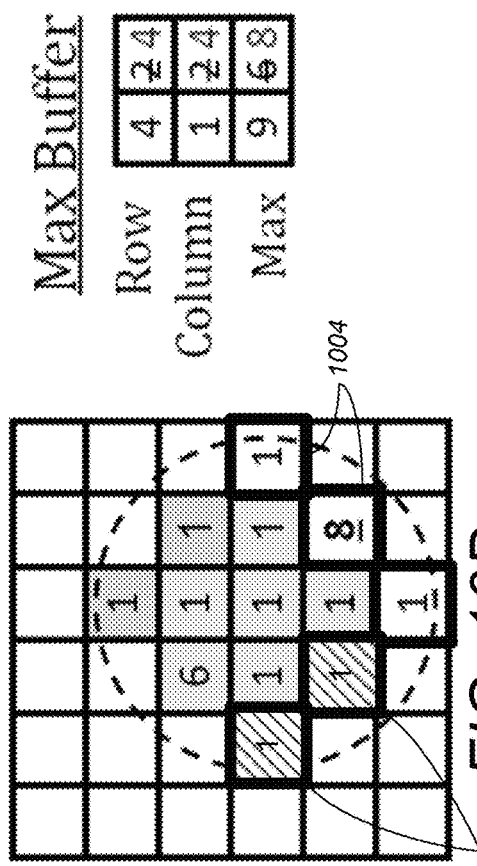
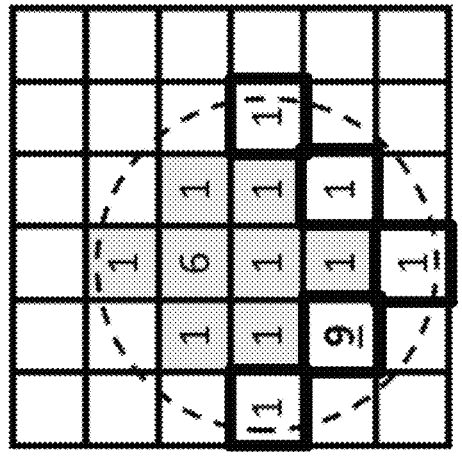
FIG. 10A  FIG. 10B  FIG. 10C  FIG. 10D

UNMANNED AERIAL SYSTEM (UAS) AUTONOMOUS TERRAIN MAPPING AND LANDING SITE DETECTION

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 63/185,601, filed on May 7, 2021, with inventor(s) Pedro Duarte Lopes Mascarenhas Proenca, Roland Brockers, Jeff H. Delaune, Pascal Schoppmann, and Matthias Domnik, entitled "UAV Landing Site Detection Bb Optimal Mixture of Gaussian Elevation Map Fusion and Heuristic Landing Site Selection,"; and Provisional Application Ser. No. 63/338,754, filed on May 5, 2022 with inventor(s) Pedro Duarte Lopes Mascarenhas Proenca, Roland Brockers, Jeff H. Delaune, Pascal Schoppmann, and Matthias Domnik, entitled "UAV Landing Site Detection By Optimal Mixture of Gaussian Elevation Map Fusion and Heuristic Landing Site Selection,".

This application is related to the following commonly-assigned patent application(s), which application(s) are incorporated by reference herein:

U.S. patent application Ser. No. 16/667,655, filed on Oct. 29, 2019, which issued Jan. 9, 2024 as U.S. Pat. No. 11,866,198 with inventors Roland Brockers, Stephan Michael Weiss, Danylo Malyuta, Christian Brommer, and Daniel Robert Hentzen, entitled "Long-Duration, Fully Autonomous Operation of Rotorcraft Unmanned Aerial Systems Including Energy Replenishment,", which application claims the benefit of U.S. Provisional Patent Application 62/752,199 filed on Oct. 29, 2018, which application is incorporated by reference herein.

STATEMENT REGARDING FEDERALLY SPONSORED RESEARCH AND DEVELOPMENT

This invention was made with government support under Grant No. 80NMO0018D0004 awarded by NASA (JPL). The government has certain rights in the invention.

BACKGROUND OF THE INVENTION

1. Field of the Invention

The present invention relates generally to autonomous operation of unmanned aerial systems (UAS), and in particular, to a method, system, apparatus, and article of manufacture for mapping and detecting safe landing sites for a rotorcraft UAS with applications including autonomous flights on Mars and Earth.

2. Description of the Related Art (Note: This application references a number of different publications as indicated throughout the specification by author/title names and years of publication enclosed in brackets, e.g., [A Smith 2020]. A list of these different publications ordered according to these author/title names can be found below in the section entitled "References." Each of these publications is incorporated by reference herein.)

INTRODUCTION

Recent developments by NASA indicate that unmanned aerial vehicles (UAVs) could make a significant contribution to future Mars exploration, since autonomous UAVs enable science missions beyond the reach of orbiters, landed spacecrafts or rovers [J Balaram 2018][W Johnson 2020]. Ingenuity, NASA's Mars Helicopter, which recently landed on Mars (carried by the Perseverance rover), demonstrated the first powered flight on another planet. While Ingenuity assumes flat and level terrain during flight [D Bayard 2019][H Grip 2019], future planetary rotorcrafts need the ability to fly fully autonomously over complex 3D terrain, which is one of the reasons why NASA is interested in safe landing site detection in previously unknown and unstructured terrain. In this regard, the Ingenuity will have to perform its flights completely autonomous, since signal delays between Mars and Earth prevent human interaction during flight. Such a helicopter would enable access to areas out of reach for rovers, and enable regional-scale science exploration [J Bapst 2020]. Further, flights over 3D terrain require an autonomous safe landing capability that includes landing hazard detection, since existing terrain maps, e.g., derived from HiRISE orbital images, do not have the required resolution to resolve all landing hazards, and landing maneuvers in emergency situations might need to be executed at any time during flight. Likewise on Earth, commercial drones still rely heavily on return-to-home mode and do not feature autonomous emergency landing. In addition, it should be noted that on-board processors within UAVs have limited processing power.

A critical part in the development of autonomous rotorcrafts is to ensure their safety. Therefore, it is essential that the vehicle has a mean of perceiving and understanding its surroundings as accurately and certain as possible at all times. In this way, hazardous objects can be detected and collisions avoided. To land in a safe place at the end of a mission or in case of an emergency, such as rapid battery degradation or sensor failure, future planetary rotorcrafts have to be able to detect safe landing sites in previously unknown and challenging terrain autonomously and without human intervention.

The landing site detection system on-board is constrained to size, weight and power (SWaP) (e.g., due to the limited payload capability in Martian atmosphere). Since weight has a considerable influence on energy consumption and thus on flight duration, a lightweight and energy-efficient sensor and computing architecture is required. In addition, the algorithms used for mapping and landing site detection must be efficient enough to be applied in real time on an embedded system with limited computational resources.

RELATED WORK

Autonomous UAV landing has been widely discussed in the UAV literature. Several vision-based approaches have been proposed to provide landing sites with known artificial markings, which can be detected on individual images [S Saripalli 2002][D Falanga 2017].

Approaches to detect safe landing sites from monocular image sequences are presented in [S Bosch 2006][R Brockers 2011]. Using a homography assumption, an incremental model is constructed that only includes horizontal, flat surfaces (e.g., rooftops). Therefore, the map cannot be used for obstacle avoidance. [V Desaraju 2015][R Brockers 2014]propose a vision-based landing site detection framework to estimate a planar rooftop landing area by deploying a homography strategy. However, the use of a homography in complex 3D terrain is not feasible. For the purpose of spacecraft landing, NASA has developed an autonomous landing hazard avoidance system using a Lidar for 3D perception of landing hazards [N Trawny 2015][M Luna 2017]. [A Johnson 2002][S Scherer 2012] use range sensors for large-scale UAV landing. However, given weight and size constraints, range sensors are not suitable for a weight restricted UAV. The Mars 2020 mission deploys LVS, a lander vision system to detect landing hazards [A Johnson 2020]. Given an on-board map with predetermined hazard locations, LVS uses a monocular camera to estimate the spacecraft's position during descent and triggers an avoidance maneuver if necessary. Unfortunately, landing hazards for UAVs are much smaller than for landers, and maps with the resolution required to detect UAV landing hazards offline are not available (HiRISE's best resolution is ~25 cm/pixel). Additionally, previously acquired maps cannot annotate dynamic landing hazards (e.g. previously not present objects, such as cars, persons or changes in vegetation on Earth). [0014][A Johnson 2005] describes vision-based (i.e., optical flow-based) autonomous landing in unknown, 3D terrain (i.e., for landing hazard detecting on-board a helicopter). Using a Structure from Motion (SfM) approach, a dense point cloud is calculated and projected onto a digital elevation model/map (DEM). The DEM is then evaluated for roughness and slope to segment safe and unsafe landing sites (e.g., to cope with different altitudes, high terrain relief, sensor noise, and camera pitch). While this approach demonstrated the feasibility of on-board detection, the resolution of the 3D reconstruction was reduced significantly to enable on-board execution, and no temporal fusion was implemented. Further, while this work determines the landing site entirely on a single DEM, embodiments of the invention continuously fuse depth measurements into a local elevation map to temporally improve the map representation in the present of 3D depth errors. Most recent works fuse a stream of depth maps from an SfM approach into a 2.5D elevation map [P Fankhauser 2014][C Forster 2015][S Daftry 2018]. These works apply a simple arithmetic on the elevation map, by using a local neighborhood operator to check if the surrounding cells have a similar height to detect flat and obstacle free regions. While in [P Fankhauser 2014][S Daftry 2018] the map resolution is fixed, [C Forster 2015] switches the resolution of the elevation map depending on the flight altitude, but does not store multiple resolutions and therefore information is lost during resampling. Further, [J Zienkiewicz 2014] reconstructs a surface using dynamic levels of detail.

A number of research approaches use vision-based methods to reconstruct the 3D structure of the overflown terrain based on images from a monocular camera. These approaches couple the reconstruction problem with the state estimation problem and mainly focus on Simultaneous Localization and Mapping (SLAM) [J Engel 2018], [J Engel 2014]. However, embodiments of the invention utilize a state estimator that is a stand alone module for robustness purposes, and for computational efficiency.

In [J Zienkiewicz 2016] a fixed surface map is adapted to incorporate depth maps with multiple resolutions. Depth maps are directly fused into a multi-resolution triangular mesh based on a regular grid. The proposed algorithm is computationally demanding and requires a high-end GPU. While this is not feasible for on-board processing on a small embedded processor, embodiments of the invention follow the idea of a multi-resolution map to fuse image-based 3D measurements based on the local pixel resolution, but implement a different, grid-based surface representation.

ETH Zurich has also published the Maplap open source frame work [T Schneider 2018] that combines several 3D reconstruction and mapping research algorithms. However, these algorithms are computationally too demanding for on-board processing on a small embedded processor. This is also the case for several component approaches which require a high-end GPU for near real-time execution [M Pizzoli 2014], [J Zienkiewicz 2014].

Further to the above, it may be noted that the problem of terrain mapping for planetary exploration was initially addressed in [IS Kweon 1989]. Since then, NASA has developed several hazard detection systems for spacecraft landing [N Trawny 2015, M Luna 2017, A Johnson 2002, and A Johnson 2005]. However [N Trawny 2015, M Luna 2017, and A Johnson 2002] use a flash LiDAR, which is not suitable for weight-restricted UAVs (e.g. Mars Helicopter). LiDAR was also used in [S Scherer 2012] to assess the terrain for landing a Helicopter by considering the rotor and tail clearance.

Recently, the Mars 2020 mission used for the first time visual Terrain Relative Navigation (TRN) [A Johnson 2017] to land on a more hazardous yet more scientifically interesting location than past Mars landing locations. TRN estimates the spacecraft location with respect to a HiRISE map annotated apriori with large hazards. The HiRISE resolution is however not enough for small UAV hazards. [A Johnson 2005]proposed an algorithm for landing hazard avoidance based on a moving monocular camera. In that work, a dense DEM is reconstructed by interpolating measurements from a single frame but measurements are not aggregated across multiple frames. The DEM is binarized based on plane fitting and a simple Distance Transform is then used to select the safest location closer to an a-priori landing site.

Continuously fusing measurements with a single layer DEM was done in [C Forster 2015, P. Fankhauser 2014, and P. Fankhauser 2016] using Kalman updates. Although [C Forster 2015]proposed a mechanism to switch between map resolutions for different altitudes, this is not flexible enough for complex 3D terrain and off-nadir viewpoints. In [R Triebel 2006] elevation maps are extended to represented multiple surface levels, common in urban environments. For such structured scenes, [S Bosch 2006, R Brockers 2011] proposed using Homography to detect and land on large planes (e.g., rooftops). In [T Hinzmann 2018, M Warren 2015] landing sites are detected based on both texture and geometric shape. Gaussian Processes have been used in [S Vasudevan 2009] to interpolate sparse maps and in [M Popovic 2017] for multiresolution mapping. Embodiments of the invention provide a multi-resolution hazard mapping and segmentation approach which can be further extended as described herein.

SUMMARY OF THE INVENTION

Embodiments of the invention provide a system that enables UAVs to map their local environment and find safe landing sites (e.g., using a single downfacing navigation camera as a light-weight sensor option). In order to enable the system to be used in remote and previously unknown areas or in an emergency, embodiment of the invention may limit the system to use only the computing capacity available on-board. To achieve this goal, embodiments of the invention use a Structure-from-Motion (SfM) algorithm that is coupled with an on-board pose estimator to generate dense and metric depth maps. However, since these depth maps are noisy and incomplete, the depth maps are temporally fused into a consistent model of the environment in order to cope with individual noise and outliers. As surface representation, a 2.5D robot-centric multi-resolution digital elevation map is used, that maintains a hierarchy of approximations of the environment at multiple scales, sufficient for many autonomous maneuvers and safe landing site detection in outdoor environments. Finally, embodiments of the invention present a landing site detection approach, which efficiently exploits the multi-resolution structure of the underlying map by applying a coarse-to-fine search approach based on different cost functions, such as slope, roughness, space and uncertainty.

BRIEF DESCRIPTION OF THE DRAWINGS

Referring now to the drawings in which like reference numbers represent corresponding parts throughout:

FIG. 8 illustrates a system pipeline for optimizing terrain mapping and landing site detection for autonomous UAVs in accordance with one or more embodiments of the invention;

FIGS. 9A-9B illustrate the pyramid pooling scheme for a 1D cell's pyramid example in accordance with one or more embodiments of the invention;

FIG. 10A-10D illustrate the example of a max search using a rolling buffer for roughness computation in accordance with one or more embodiments of the invention;

DETAILED DESCRIPTION OF THE PREFERRED EMBODIMENTS

Figure 1:
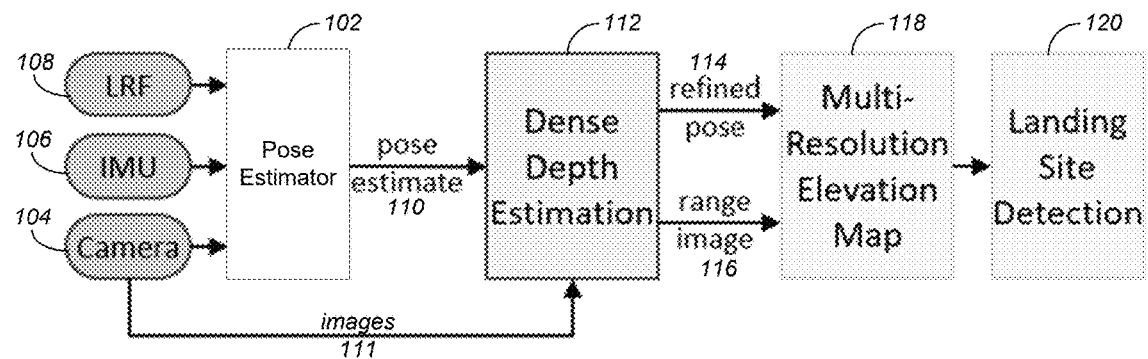
FIG. 1 illustrates an overview of a processing pipeline on-board a UAV in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a landing site detection framework that is executed continuously on a small embedded processor on-board an autonomous rotorcraft. Embodiments of the invention may provide one or more of the following:

A local, robot-centric, 2.5D multi-resolution digital elevation grid map that aggregates vision-based 3D measurements seamlessly based on their corresponding pixel footprint on the overflown surface.

A lightweight map fusion algorithm that incorporates depth measurements according to their lateral surface resolution (pixel-footprint) using Kalman filter.

A lightweight map fusion algorithm that incorporates depth measurements according to their lateral surface resolution (pixel-footprint) using Optimal Mixture of Gaussian (OMG).

An efficient landing site detection algorithm that extracts safe landing sites based on slope, roughness, space requirements and map quality, exploiting the multi-resolution structure.

In addition, embodiments of the invention present a qualitative and quantitative evaluation on synthetic and real data sets, which reveals the performance of the described framework.

Helicopter Overview

A helicopter or unmanned aerial vehicle (UAV) is designed to succeed the Mars Helicopter Ingenuity to be the first aerial exploration platform on Mars. Mars Science Helicopters (MSH) of embodiments of the invention currently envision a science payload between 1 and 5 kg, depending on the vehicle variant chosen, and other mission parameters, such as a flight range of up to 25 km at up to 100 m altitude, or additional hover time of up to 8 minutes for science data acquisitions. The currently anticipated MSH avionics hardware follows the Mars Helicopter avionics concept with an upgraded navigation processor, with capabilities similar to a QUALCOMM SNAPDRAGON 820 or 855 System on a Chip (SoC).

Potential deployment scenarios are collecting samples from sensitive areas on Mars, autonomous meso-scale mapping, atmospheric sampling, cave exploration, or cliff-wall imaging and interaction [J Bapst 2020]. Any MSH mission designed to address a specific scientific need will require the capability to autonomously identify and land on safe landing sites.

While the Mars Helicopters are perfect examples for a UAV operating on a GPS denied environment that require autonomous execution of mapping and landing site detection, the invention is not limited to planetary rotorcrafts, and embodiments of the invention might be deployed on any other autonomous UAV on Earth, such as but not limited to: multi-rotorcrafts, fixed wing vertical take-off and landing (VTOL) vehicles, and fixed wing UAVs. These UAVs might operate in GPS denied environments or use GPS signals for their on-board pose estimation.

System Overview

FIG. 1 illustrates an overview of a processing pipeline on-board a UAV in accordance with one or more embodiments of the invention. An on-board odometry algorithm (i.e., a pose estimator 102) estimates the pose of the UAS

110. One embodiment may use a range-visual-inertial odometry algorithm (e.g., xVIO) 102 estimates the current pose of the UAV using a downward-facing camera 104, an Inertial Measurement Unit (IMU) 106, and a Laser Range Finder (LRF) 108. In one or more embodiments where xVIO is utilized as the pose estimator, xVIO 102 fuses measurements from these three sensors 104-108 in a tightly-coupled approach to overcome critical weaknesses of VIO, e.g., unobservability of scene depth while hovering, and unobservability of scale during constant-velocity traverses (with the optional LRF) [J Delaune 2020]. The pose estimator 102 is a standalone module for modularity.

While pose estimates 110 are accurate enough for controlling the UAV, they are not sufficiently accurate to support dense vision-based 3D reconstruction. Therefore, embodiments of the invention deploy a windowed bundle adjustment (BA) algorithm to improve camera poses. In contrast to full bundle adjustment approaches which refine the complete history of camera poses and feature locations, one goal of an algorithm of embodiments of the invention is to improve only camera poses in the recent history that may be used for 3D reconstruction—which requires images that observe corresponding terrain (image overlap). We refer to the recent history of camera poses as a window, that consists of n keyframes. Individual keyframes are selected out of the stream of individual images and collected in a sliding window keyframe buffer together with their corresponding camera poses that is used as a prior during BA.

New keyframes are selected by evaluating the rotation compensated, frame-to-frame parallax, which ensures a required amount of movement between the frames. Since the number of keyframes and also the number of features in a window are limited, the run time of the optimization is bounded. Therefore, within a dense depth estimation/estimator 112 (that uses pose estimates 110, and images 111 captured by the on-board camera 104), a camera pose refinement step 208 [M Domnik 2021] is deployed, using the outputs from the estimator 110 as pose priors.

Based on baseline and feature-related constraints, two or more images are selected and a conventional real-time stereo algorithm [S Goldberg 2002] is deployed to calculate a dense stereo disparity image. Finally, by triangulating the disparity image, a range image 116 containing the 3D positions of each pixel in the world frame is achieved. Range images 116 are then used to incrementally build a robot-centric, multi-resolution digital elevation map 118 adapted for landing applications. Whenever a new range image 116 is available, the corresponding Level of Detail (LoD) is calculated for every 3D point in the image based on the footprint of the corresponding pixel on the overflown surface, and a Bayesian update step is performed to update affected map cells. This has the advantage that the map representation can incorporate measurements naturally based on their lateral resolution with no need for resampling, as will be explained below.

Figure 2:
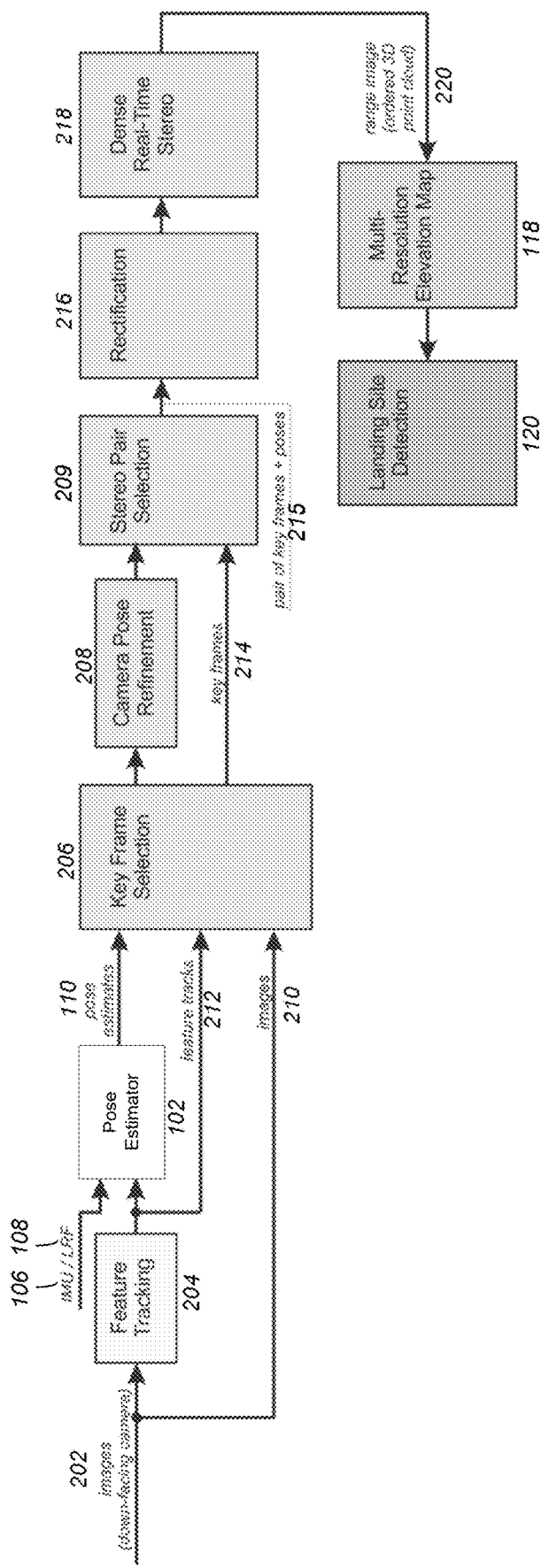
FIG. 2 illustrates a different overview of an integrated processing pipeline for complete navigation software that may be utilized in accordance with one or more embodiments of the invention.
Figure 12:
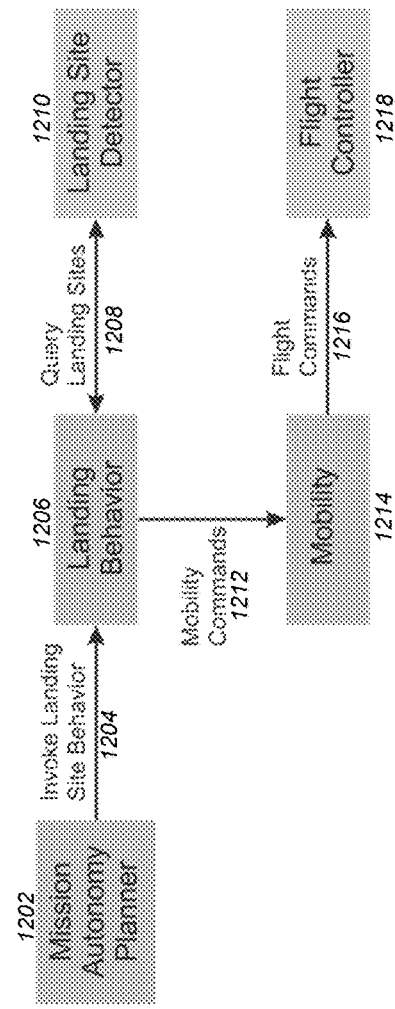
FIG. 12 illustrates the notional architecture for a landing behavior in accordance with one or more embodiments of the invention.

Referring to FIGS. 1, 2, and 12, when a landing site is requested by the UAS autonomy (i.e., the landing behavior 1206), the landing site detection/detector 120/1210 evaluates the multi-resolution map 118 in several steps exploiting the multi-resolution structure and using various cost functions, as will be described below resulting in a binary map indicating if a map cell is a feasible landing site or not.

Further to the above, FIG. 2 illustrates a different overview of an integrated processing pipeline for complete navigation software that may be utilized in accordance with one or more embodiments of the invention. Landing site detection in unknown terrain requires a robust method of on-board 3D perception. A 3D reconstruction approach may be coupled with the on-board state estimator. This has two advantages: First, sensor data such as imagery from a down-facing navigation camera can be reused for 3D reconstruction. Second, outputs from the estimator can directly be used as pose priors for a structure-from-motion approach, which reduces the computational cost of necessary camera pose reconstruction within the structure-from-motion approach compared to conventional vision-only approaches.

Images 202 from the down-facing navigation camera are passed to a feature tracking module 204 to perform frame to frame feature tracking, and as raw data to the structure from motion process. The pose estimator 102 fuses measurements from feature observations and data from the on-board IMU 106 and a (optional) laser range finder (LRF) 108. One or more embodiments utilize IMU and LRF and Range-xVIO. Such embodiments may be implemented in a range-facet approach to regain metric scale on triangulated feature observations that can adapt to any terrain topography. This approach guarantees stable pose estimates 110 during critical maneuvers, such as hovering with no motion, and straight line, constant speed trajectories, while providing state of the art accuracy with an average position error of 0.5% of distance traveled and 2° (3σ) global attitude error in roll and pitch in the absence of inertial excitation. While the pose error levels are accurate enough for controlling the vehicle, they are not sufficient for 3D reconstruction. Therefore, we select key frames 206 from the input image stream and deploy a camera pose refinement step 208 which executes a windowed bundle adjustment to improve camera poses 110 of selected keyframes and the most recent navigation camera image 210. Keyframes are stored in a sliding-window, rolling buffer, and are selected (via key frame selection 206) based on a parallax constraint, which establishes a minimum and maximum image overlap threshold for a simulated fronto-parallel plane at the distance of the overflown terrain (acquired from the LRF 108), and a minimum number of tracked features constraint 212, that requires features to be tracked in all keyframes and the current image 210. Thus, pairs of key frames 214 are provided to rectification step 216.

After the refinement step 208, an image pair and/or multiple images are selected 209 from the keyframe buffer (e.g., the buffer containing key frames 214) based on baseline constraints (e.g., distance between the cameras when the images were taken) to form a stereo image pair with the current image. The image pair and the associated improved camera poses 215 are passed on to a rectification step 216 which then aligns the images to allow the use of a conventional stereo algorithm. Finally, a conventional/dense real-time stereo algorithm 218 [S Goldberg 2002] is deployed to calculate a dense stereo disparity image which is triangulated into a range image 220 (e.g., a 3D point cloud) to contain the 3D positions of each pixel that was assigned with a valid stereo disparity. The range image 220 is provided to the multi-resolution elevation map 118 which is used to perform landing site detection 120. In view of the above, feature tracking module 204 and pose estimator 102 provide the leveraged state estimator functions, modules 206, 208, 216, and 218 perform 3D reconstruction, and modules 118 and 120 enable landing site detection.

Figure 3:
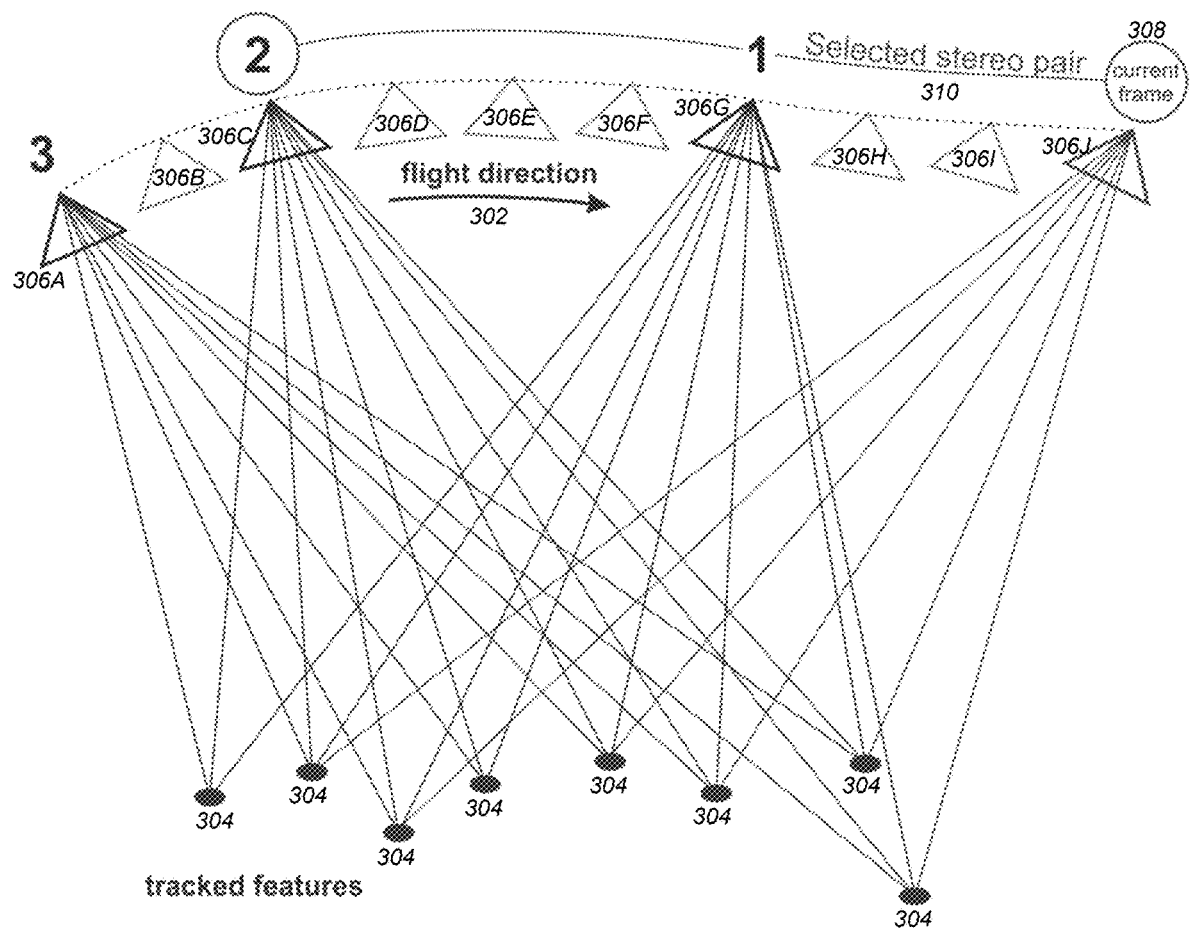
FIG. 3 illustrates a keyframe approach and stereo frame selection steps in accordance with one or more embodiments of the invention.

FIG. 3 illustrates the keyframe approach and stereo frame selection steps 206-218. The UAS travels in flight direction 302 while tracking features 304. Poses 306A-306J of the current frame 308 (i.e., pose 306J) and previous keyframes (i.e., poses 306A-306I) are optimized during the camera pose refinement step 208. A keyframe is selected to form a stereo image pair 310 with the current view.

Figure 4B:
FIGS. 4A and 4B illustrate a 3D reconstruction example in accordance with one or more embodiments of the invention.
Figure 4A:
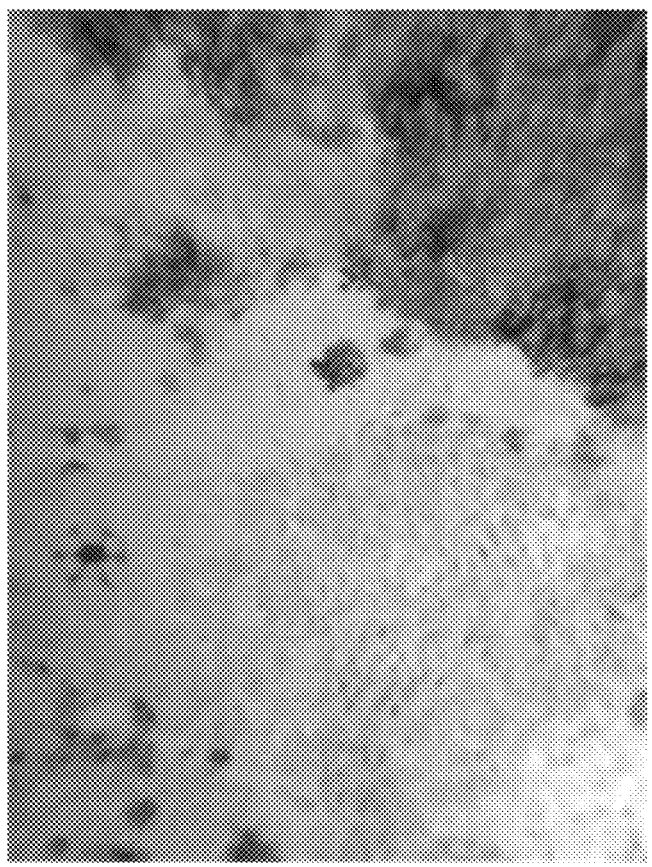

FIGS. 4A and 4B illustrate a 3D reconstruction example in accordance with one or more embodiments of the invention. Specifically, FIG. 4A illustrates a rectified reference image from a UAS flight, and FIG. 4B illustrates a reconstructed range image 402 where brighter pixels are farther away from the camera.

Tying the 3D measurement to the pixel footprint has the advantage that the pixel resolution on the ground can be used to aggregate measurements of similar resolution into a common representation, as will be explained in the next section.

Terrain Mapping

The SfM system described above can efficiently create depth maps and thus enable a UAV to perceive its 3D environment. However, since depth maps tend to be noisy and incomplete, due to non-Lambertian surfaces, occlusions, or textureless regions, their direct use for safe landing site detection is limited. Hence, it is necessary to temporally fuse them into a consistent model of the UAV's environment. Furthermore, when a UAV overflies a surface at different altitudes, depth maps with different resolutions are estimated and need to be incorporated into a single map.

Multi-Scale Surface Representation

Figure 5A:
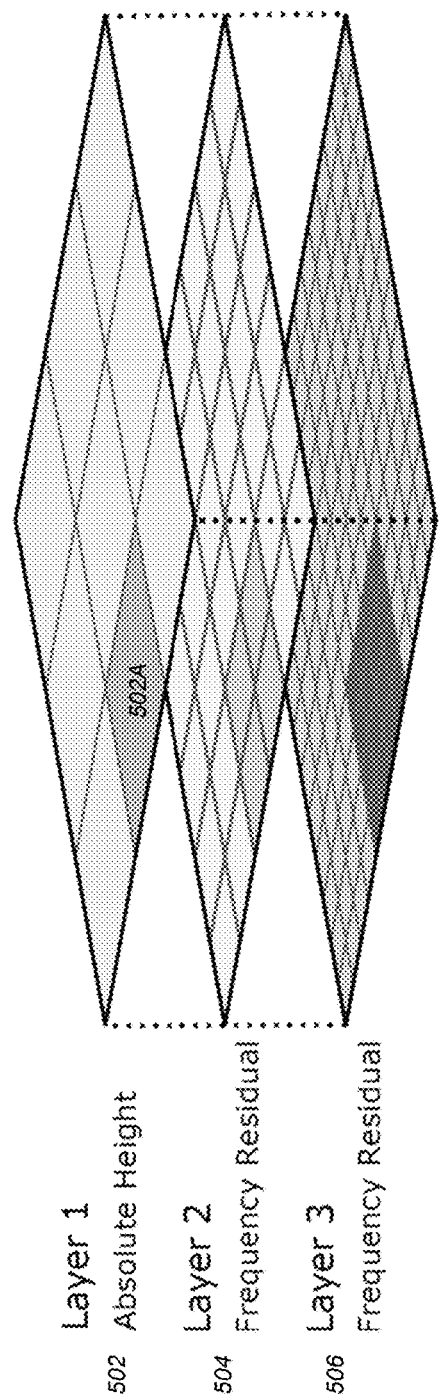
FIGS. 5A-5C illustrate the structure of a height map in accordance with one or more embodiments of the invention.
Figure 5B:
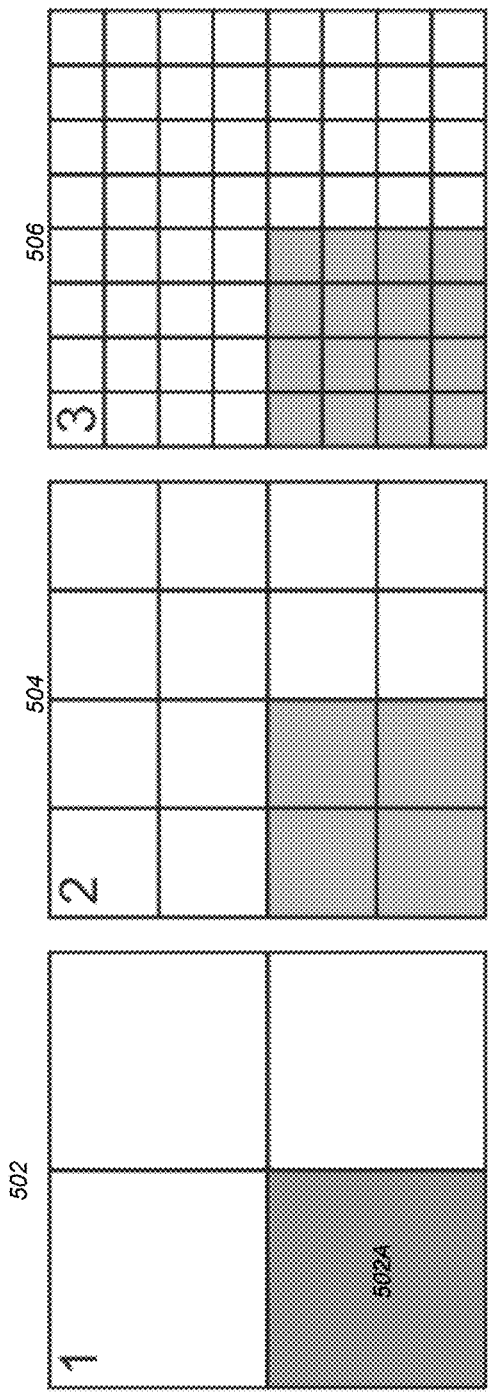
Figure 5C:
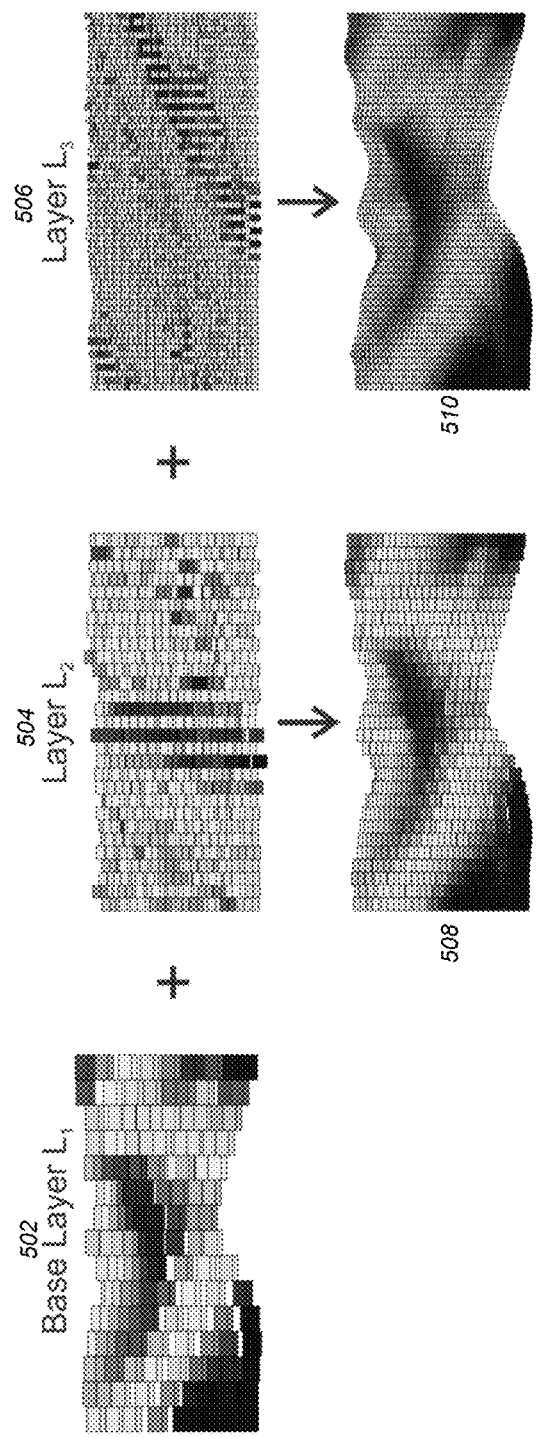

To incorporate the estimated depth maps into a single map, 3D range measurements are fused/processed into a multi-resolution elevation map that is based on a Laplacian pyramid decomposition representing the observed environment with multiple scales in a single, consistent model. FIGS. 5A-5C illustrate the structure of the map, where each layer 502-506 contains a regular sampled 2D grid map with predefined, fixed topology. Specifically, FIG. 5A illustrates a multi-resolution map structure while FIG. 5B illustrates the map resolutions for different layers. Subsequent layers are sub-sampled by a factor of two, allowing to incorporate new measurements probabilistically in a coarse-to-fine manner. Embodiments of the invention may deploy other sub-sampling factors that may or may not be constant for the complete map pyramid. A base layer 502 with the lowest resolution carries the aggregated height estimate for all measurements within the footprint of a cell 502A in this layer, higher resolution layers 504-506 store the difference between the height estimate at the current layer and the aggregated courser layers.

Inspired by the Laplace pyramid by Burt-Adelson [P Burt 1983], the layers 502-506 within the pyramid contain different frequencies of the surface structure, where finer resolved layers contain higher frequencies not captured by the coarser layers. An advantage of the Laplacian pyramid is that individual layers can be assumed to be independent, which simplifies fusion and enables recursive estimation. As described above, the map does not store the environment at multiple resolutions as widely used in computer graphics, but uses an implicit representation, where the coarsest layer (e.g., layer 502) contains the aggregated height values of all measurement within the footprint of a coarse cell (i.e., cell 502A). Subsequent layers only store frequency components called residuals calculated by:

$$r_{k+1} = z - h_k = z - \left(h_1 + \sum_{n=2}^{k} r_n\right)$$

where z is the measured elevation and $h_k$ the aggregated height, $h_1$ respectively is the height stored in the coarsest layer (base layer, or layer 1). Reconstruction of the surface is straight forward by simply adding the different layers of the pyramid. Given a position (x, y) on the surface, the extracted height is calculated by:

$$h_l(x, y) = h_1(x, y) + \sum_{n=2}^{l} r_n(x, y)$$

where $h_1(x, y)$ is the absolute height of the base layer with respect to the UAVs initial position while $r_n(x, y)$ are the residuals at position (x, y) and pyramid level n.

The layout described enables cell retrieval in their corresponding coarser or finer grid maps efficiently and in a simple manner. Cells at any scale are denoted by their integer coordinates $x_l$ at the finest resolution. If d is the maximum depth of the pyramid and l the desired layer, the scaling factor is given by $s=2^{d-l}$ with $1 \leq d$. Hence, index coordinates to access the multi-resolution grid at any resolution l can be obtained by simple arithmetic as:

$$x_l = \left\lfloor \frac{x_d}{s} \right\rfloor$$

where $x_d$ represents the index of the cell at the finest resolution. The memory overhead of the Burt-Adelson pyramid scheme is 4/3 compared to a single layer map [P Burt 1983].

FIG. 5C illustrates surface reconstruction from a multi-resolution map in accordance with one or more embodiments of the invention. The higher the layer in the pyramid added, the more details appear. More specifically, FIG. 5C illustrates the reconstructed maps 508-510 with different levels of resolution (i.e., level 2 504 resolution in reconstructed map 508 and level 3 506 resolution in reconstructed map 510).

In view of the above, it may be noted that embodiments of the invention may be motivated by two aspects that define the mapping process: (1) The measurement accuracy of the 3D point cloud is directly tied to the pixel footprint on the ground since 3D points were reconstructed by an image-based method. Thus, a map representation that can ingest different measurement resolutions is preferred; and (2) On the other hand, the primary goal for the map implementation is computational efficiency. Therefor it is desired that landing hazards can be detected at the coarsest resolution possible to save computation time.

Dynamic Level of Detail

When flying over 3D terrain or when the camera is mounted at an oblique angle, the pixel footprint of a measurement varies within a depth map. Therefore, it is not practical to work with a single global map resolution, since a single resolved map typically results in aliasing artifacts when the selected resolution is too high or details disappear if the resolution is too small. To cope with measurements with varying resolutions, embodiments of the invention apply a dynamic level of detail concept which is inspired by computer graphics methods [J Zienkiewicz 2014] to adapt the complexity of an object to the expected on-screen pixel resolution. Applying the inverse process, a measurement is incorporated only up to the level of the Laplacian pyramid with the corresponding pixel resolution. The first step is to compare the pixel footprint of a measurement i, representing the area of a pixel in the range map projected on the surface, $$p_{xi} = \frac{2(z_a - z_i) \cdot \tan\left(\frac{FOV_x}{2}\right)}{n_x}$$

with the resolutions represented in the map levels. Here $z_a$ is the current altitude of the UAV, $z_i$ the elevation of the measurement, FOV the field of view of the camera and $n_x$ the size of one image row. Therefore, the parameter controlling the LoD is the distance of a point to the camera. Finally, the level with the next lower resolution to the measurement resolution is selected as the target level. By only incorporating the measurements up to the desired resolved layer, one can minimize aliasing artifacts.

In view of the above, the multi-resolution map structure combines the two effects naturally. Measurements are inserted only up to the pixel resolution of the 3D reconstruction process, and computational cost can be reduced, by detecting unsafe landing areas already in coarser levels. In other words, following the dynamic Level of Detail (LoD) approach, the new measurement with an assigned resolution (pixel footprint) only has to update the map representation up to the layer that corresponds to its resolution. Finer resolution layers remain untouched. The landing site detector can perform a top down approach to find suitable landing areas. If the terrain at a coarse map resolution already violates the landing constraints, the detection is aborted for this particular area, which leads to a faster execution on average. Further, the process of extracting an elevation map with a desired resolution is simple, since it only involves adding the individual map layers up to the desired resolution.

To limit memory access during map access, embodiments of the invention fix the map size in memory, make the map robot-centric and locate the map directly beneath the rotorcraft. When the vehicle moves laterally, the map is moved accordingly by a double rolling buffer implementation, invalidating map cells that move passed the map boundary and adding them in the direction of motion. This leads to an implementation where a map cell with a fixed global position remains at the same location in memory. No resampling is required.

Map Update

Given the pyramid structure in which the coarsest layer contains absolute height values and the subsequent layers the residuals, it is possible to directly estimate the coefficients of the Laplacian pyramid. Each depth map is processed as it arrives to incrementally update the map in a coarse-to-fine manner. Updates are first applied to the base level, then for each finer level. Residuals are calculated and fused until the required level of detail has been reached, repeated recursively for each individual 3D measurement. This allows the subtraction of the current height estimate (aggregated from the coarser levels) from the height measurement to calculate the measurement residual which is then fused with the current layer by a Kalman update. Thus, individual map cells are updated by a Kalman update step, using a measurement variance directly derived from the expected maximum stereo disparity error of 0.25~px (i.e., since the stereo algorithm provides sub-pixel precise disparity maps) neglecting pose uncertainty. Given the height measurement $h_i$ which corresponds to the z-axis of the world coordinates, and the height variance $\sigma_i$ which is calculated given a baseline from the 3D reconstruction process, the recursive Kalman update step to update the height estimate $h_p$ and variance $\sigma_p$ of the corresponding cell is formulated as [M Herbert 1989]:

$$h_p \leftarrow \frac{h_p \sigma_i^2 + h_i \sigma_p^2}{\sigma_p^2 + \sigma_i^2}$$

$$\sigma_p^2 \leftarrow \frac{\sigma_p^2 \cdot \sigma_i^2}{\sigma_p^2 + \sigma_i^2}$$

Note, that the same measurement uncertainty $\sigma_i$ is applied in all levels, since the predicted height is assumed to be constant among layers.

Map Movement

Figure 6:
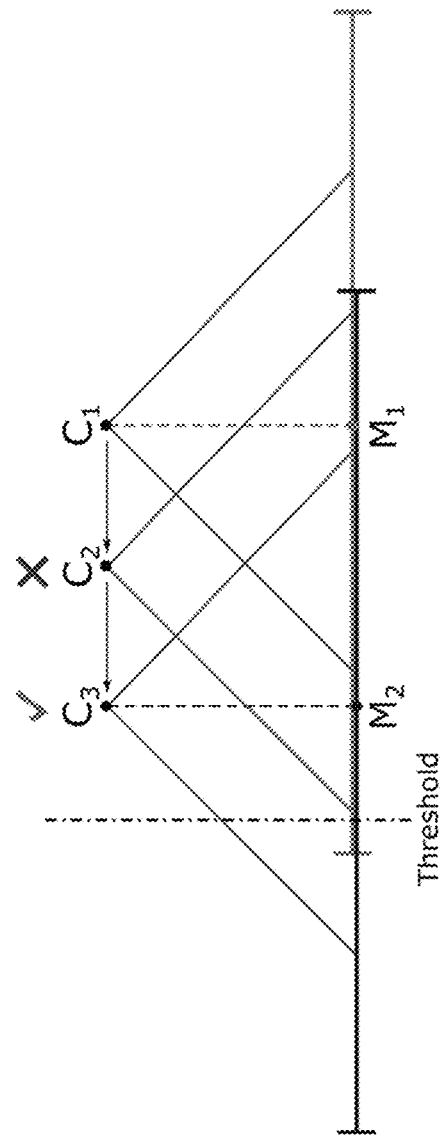
FIG. 6 illustrates the scheme of map movement logic in accordance with one or more embodiments of the invention.

As described above, the map with fixed size may be implemented using a two-dimensional rolling buffer. Therefore, the map requires constant memory and can be moved efficiently by shifting indices and resetting cells that move out of the map area. Besides being memory efficient, a rolling map is non-destructive. In order to prevent loss of data while moving back and forth, the map is only moved when a measurement at a new position falls outside of the map boundaries as depicted in FIG. 6. In FIG. 6, the map is pseudo-robot-centric and located directly underneath (as indicated by map position $M_1$ and $M_2$) the UAV (as indicated by positions $C_1$-$C_3$) to deal with drift in the pose estimate. More specifically FIG. 6 illustrates the scheme of map movement logic in accordance with one or more embodiments of the invention. When the UAV moves from position $C_1$ to $C_2$, the map is not moved since the new measurements still fall into the map area. At the third position $C_3$, the measurements lie outside the boundary/threshold of the map, and the map is moved from position $M_1$ to $M_2$.

In view of the above, a regular sampled elevation map is a straight forward 3D surface representation for UAVs with limited computational capabilities. An obvious drawback of the regular grid is that cell borders do not correspond to natural features of the surface and the measurement resolution does not need to correspond to an existing layer resolution. Being aware of this drawback, it may be noted that the proposed representation is sufficient for the task of autonomous UAV landing site detection. Artifacts can occur in the areas within the map where the resolution changes between neighboring cells. However, since this is only the case in non-flat areas of the map, those artifacts can be ignored for the purpose of landing site detection.

Improved Terrain Mapping

The above described terrain mapping that aggregates 3D measurements as residuals in a multi-resolution pyramid map for landing site detection. To avoid updating all pyramid layers for each measurement, the pixel footprint is used as a criteria to select which layers to update. Although this minimizes the number of pyramid updates for far away measurements (relative to the pyramid's resolution) it can lead to incoherent maps between layers.

Embodiments of the invention may utilize an alternative pyramid scheme that effectively decouples the mapping into 2 parts: a measurement update that selects and updates the correct layer and a pyramid filling process, called pyramid pooling, that enforces consistency between layers.

Figure 7:
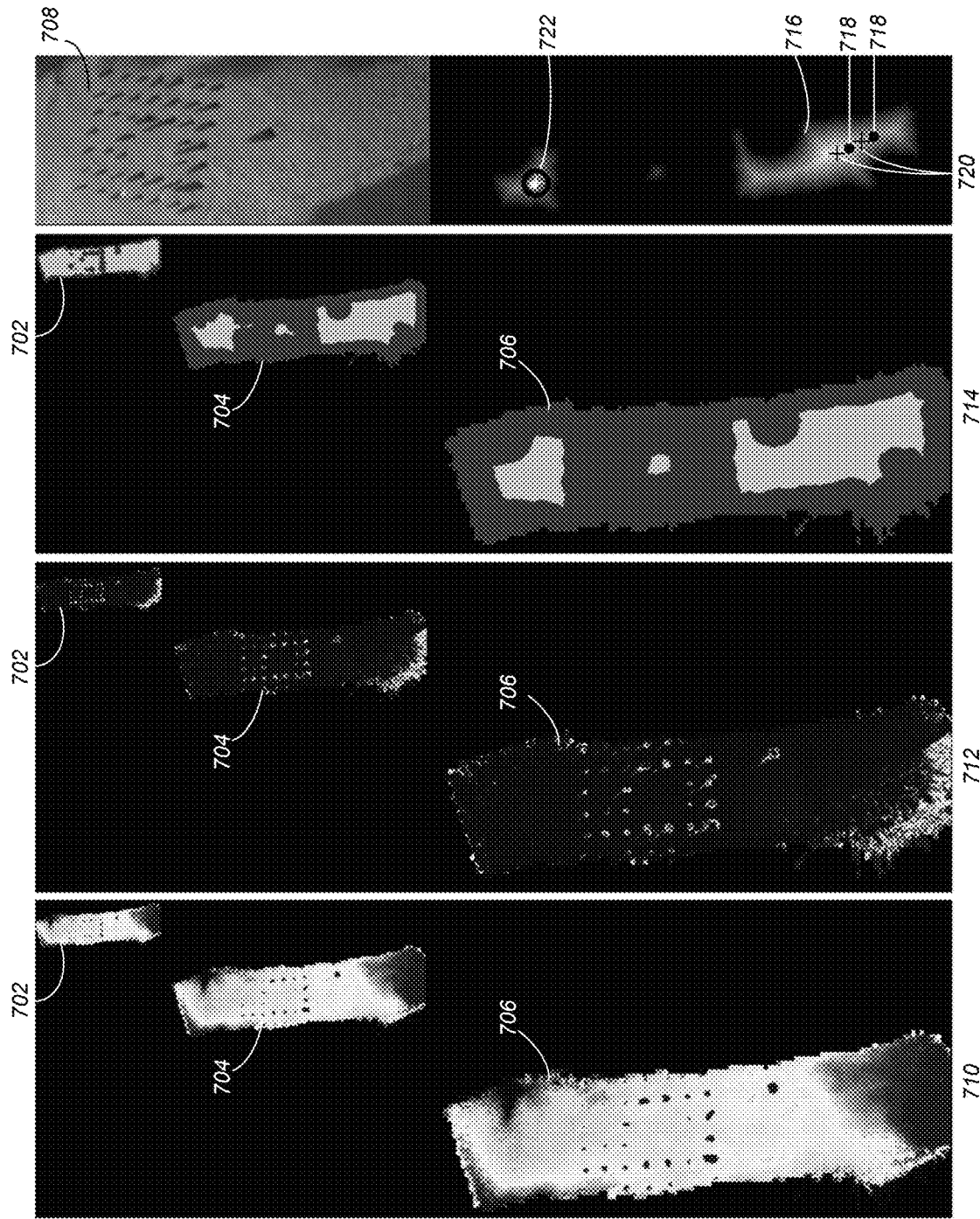
FIG. 7 illustrates multi-resolution maps with 3 layers generated by embodiments of the invention.

Moreover, sensor fusion [IS Kweon 1989, C Forster 2015, and P. Fankhauser 2014] has been dominated by Kalman updates (i.e. multiplication of Gaussians), where each pyramid cell is effectively a 1D Kalman filter. Although, optimal in the least squares sense, the Kalman filter uncertainty does not capture the discrepancy between measurements in a cell. Therefore, embodiments of the invention fuse measurements using Optimal Mixture of Gaussians (OMG), by extending the work done in [P Proenca 2018]. The advantage of OMG, demonstrated in FIG. 7 is that the uncertainty captures both the sensor error model and the observed variance between measurements within each cell. More specifically, FIG. 7 illustrates multi-resolution maps with 3 layers 702-706 generated by embodiments of the invention along with landing spot detection during a 3 m altitude flight over a rock field 708. Image 710 illustrates DEM, image 712 illustrates DEM uncertainty, and image 714 illustrates landing segmentation. Image 716 shows the distance transform obtained from the binary landing segmentation and 3 landing spot candidates. These are initialized as distance transform peaks (dots 718) and then shifted (crosses 720) towards less locally rough and less uncertain areas. Circle 722 marks the selected location. Notice how the uncertainty is higher on the rock discontinuities, outliers and shadows, where stereo reconstruction errors are higher.

Thus, embodiments of the invention optimize the terrain mapping by:

Using a multi-resolution mapping scheme that decouples single-layer measurement updates from pyramid filling, and Fusing measurements using a new OMG cumulative form for an accurate uncertainty model.

FIG. 8 illustrates a system pipeline for optimizing terrain mapping and landing site detection for autonomous UAVs in accordance with one or more embodiments of the invention. Point cloud measurements 802, calculated by visual-inertial odometry and stereo (as described above), are processed via an elevation mapping module 804 that continuously 804A aggregates/pools 804B the measurements 802 in a pyramid structure. Landing segmentation 806 then segments the safe cells top-down by checking slope 806A and roughness 806B. The roughness check also implicitly incorporates a safety distance to existing landing hazards. Finally, in landing detection module 808, a peak detection 808B is run on the distance transform 808A, the peaks are refined (via mean shift 808C) and ranked (during spot selection 808D) based on roughness and uncertainty.

In more detail, the system, starts by aggregating point clouds 802, generated per image (depth from motion), into a pyramid structure representing a multi-resolution DEM. These point clouds 802 may be obtained, by utilizing the Structure-from-Motion system proposed in [M Domnik 2021], which couples a range-visual-inertial odometry [J Delaune 2020], a local bundle adjustment and a standard dense stereo algorithm. Also, as described herein, to keep up with the UAV motion the map is shifted using a rolling buffer if necessary to fit the observed terrain.

As described above, the DEM pyramid structure consists of N layers. The resolution of a layer is lower than the resolution of the layer below, i.e. if the resolution is half of the resolution of the layer below, the terrain footprint covered by one cell at the top layer is the footprint of 4 cells in the layer below.

Hereafter, we will simply refer to all the cells covering the top cell footprint as cell's pyramid. This is illustrated in FIGS. 9A-9B. More specifically, FIGS. 9A-9B illustrate the pyramid pooling scheme for a 1D cell's pyramid example with a subsampling factor of 2—covering the terrain footprint of the top cell. Letters represent the cell's states and arrow numbers represent the order of fusion. The left side 902A of FIG. 9A represents the input pyramid (after the single layer updates) for up-pooling and the left side 902B of FIG. 9B is a copy of the input pyramid used for down-pooling. The right sides 904A-904B are the outputs. If a target cell is empty, the source cell is simply copied. As described above, each cell is a 1D Kalman Filter state containing 2 values: fused height (or height residual) and variance. In embodiments of the invention, each cell is a 3-value OMG state, described below.

Returning to FIG. 8, once a new point cloud 802 is acquired, each point measurement updates (i.e., during elevation mapping 804) only one cell from one selected layer (i.e., at 804A). The layer is selected where the measurement's footprint fits the best, specifically, the lowest layer where the cells' footprint is larger than the measurement's footprint given by z/f where z is the measurement's depth and f is the camera focal length. This criterion was used above but to update all layers where the cell's footprint is larger than the measurement's footprint. Then, the cell is selected by quantizing the ground plane coordinates of the measurement given the resolution of the selected layer.

After updating all new measurements, the complete cell's pyramid is updated in a separate process called Pyramid Pooling 804B. This produces the same result as if one instead updated directly all layers for every single measurement but is significantly more efficient, since it requires significantly less operations and produces significantly less memory access and thus potential memory cache misses.

Landing segmentation 806 deploys the same coarse-to-fine cascade segmentation approach as described above: First, the slope is checked (at 806A) at the top layer and then only the roughness is checked consecutively at the lower layers (at 806B). The slope is obtained by fitting planes to the top cells and their neighborhood within a circular area, given a user defined landing radius based on the UAV size. The roughness involves searching the minimum and maximum height within another user-defined circular neighborhood. An optimization to this roughness check is described below by reducing the min and max search. Cells are labeled as safe if the max roughness within a circular landing site area, which is defined by a radius, is smaller than a roughness threshold.

For landing site detection (described in detail below), the results of the landing segmentation are collapsed into a binary landing map that corresponds to the highest resolution layer, and a distance transform 808A is calculated, to encode the distance to the closest landing hazard within the binary map. After detecting 808B a given number of N peaks in the distance transform map (i.e., the result of the distance transform 808A), a mean shift operation 808C which is based on the roughness map produced during landing segmentation (i.e., during pyramid roughness check 806B) is used to alter the peak position to a safer location in the vicinity of the originally detected peak. Finally, the best landing location from all N candidate landing sites is selected at 808D based on the available space around the landing site and its associated uncertainty.

Infinite Optimal Mixture of Gaussians

Given M measurements $\{x_1, \ldots, x_M\}$ and their uncertainties $\{\sigma_{x_1}^2, \ldots, \sigma_{x_M}^2\}$, the probability density function for an Optimal Mixture of Gaussians is defined as $$f(x) = \frac{1}{S}\sum_{n=1}^{M} \sigma_{x_i}^{-2} N(x_i, \sigma_{x_i}^2), \quad S = \sum_{n=1}^{M} \sigma_{x_i}^{-2}$$

In our case, $x_i$ and $\sigma\sigma_{x_i}^2$ are a height value and uncertainty. For simplicity, in this work, $\sigma\sigma_{x_i}^2$ models only the stereo depth quadratic noise due to disparity quantization. As derived in [P Proenca 2018], the resulting OMG mean and variance is:

$$\mu = \frac{1}{S}\sum_{n=1}^{M} \frac{x_i}{\sigma_{x_i}^2}, \sigma^2 = \frac{1}{S}\sum_{n=1}^{M} \frac{\sigma_{x_i}^2 + x_i^2}{\sigma_{x_i}^2} - \mu^2$$

The mean is identical to a Kalman Filter giving the Maximum Likelihood Estimation. However, the OMG variance allows us to capture the variance between measurements within a cell besides the measurement prior uncertainties.

The formulation above, used in [P Proenca 2018], is not scalable as this would require storing all measurements, but this can be rearranged to a cumulative form, where at every time step t, a new measurement $x_t$ with $\sigma\sigma_{x_t}^2$ updates the prior OMG state $\{\mu_{t-1}, \sigma\sigma_{t-1}^2, S_{t-1}\}$ using:

$$S_t = S_{t-1} + \sigma_{x_t}^{-2}$$

$$\mu_t = \frac{1}{S_t}\left(S_{t-1}\mu_{t-1} + \frac{x_t}{\sigma_{x_t}^2}\right)$$

$$\sigma_t^2 = \frac{1}{S_t}\left(S_{t-1}(\sigma_{t-1}^2 + \mu_{t-1}^2) + \frac{x_t^2}{\sigma_{x_t}^2} + 1\right) - \mu_t^2$$

Therefore, each cell state needs to store $\{\mu_t, \sigma\sigma_t^2, S_t\}$. It's worth noting that although experiments did not suffer from numerical errors, the squared terms involved in the last expression: $x_t^2$ and $\mu_t^2$ may lead to overflow for very large height values $x_t$. This can be prevented for example by first dividing all terms in the $\sigma_t^2$ equation by $x_t$ and then multiplying the result of $\sigma_t^2$ by $x_t$.

Both Kalman and OMG updates will converge after many measurements, which can be a problem in certain descending flights where high altitude measurements dominate the cell's pyramid. Thus, embodiments of the invention introduce an optional time inflation operation, where in each frame one can effectively multiply the past measurements' uncertainty by a factor k just by replacing the OMG state $\sigma^2$ and S by:

$$\sigma_t^2 = \sigma^2 + (N_t + 1)(k-1) \text{ and } S_t = S/k$$

where k is the inflation factor, $N_t$ is the number of measurements at time t.

Pyramid Pooling

To obtain a final pyramid map, for each measurement one could simply use the equations above for $S_t$, $\mu_t$, and $\sigma_t^2$.

Then, as illustrated in FIG. 9A, the states of the cell's pyramid are fused layer by layer, first from bottom to top by updating the upper layer for each filled cell in the lower layer and then, as shown in FIG. 9B, from top to bottom by updating the lower layer—while using a copy of the original pyramid. Cache misses are minimized by accessing sequentially the memory of all 2D arrays, therefore states are fused one by one into the target state. One can do so by relying on the associative property of the OMG fusion y, i.e., fusing a group of measurements is equivalent to splitting these measurements into two groups, fusing the groups individually and then fusing the two resulting states. Without loss of generality, let $\{\mu_A, \sigma_A^2, S_A\}$ and $\{\mu_B, \sigma_B^2, S_B\}$ be two cells, then one can fuse them using:

$$S_{A+B} = S_A + S_B$$

$$\mu_{A+B} = \frac{1}{S_{A+B}}(S_A\mu_A + S_B\mu_B)$$

$$\sigma_{A+B}^2 = \frac{1}{S_{A+B}}(S_A(\sigma_A^2 + \mu_A^2) + S_B(\sigma_B^2 + \mu_B^2)) - \mu_{A+B}^2$$

Both up-pooling and down-pooling leads to fewer updates than a naive multi-layer direct update.

Optimized Hazard Segmentation

The computation cost of the segmentation process described above is dominated by the roughness check at the lower layers. Formally, roughness is computed for each cell as: $\max_{i \in \Omega} h_i - \min_{i \in \Omega} h_i$ where $h_1$ is the height at ith cell and $\Omega$ is the set of all cells within a distance to the query cell.

As shown in FIGS. 10A-10D, in certain cases one does not need to search the min and max for the entire circular region $\Omega$, since most of that region overlaps with past searched regions from cell neighbours. This fact is exploited by storing the min and max values and their 2D locations in a 1D rolling buffer (row-major). This leads to 4 search subregions, highlighted in FIG. 10D, that depend on the status of the top and left cells, i.e., if the stored max and min locations are still within the new $\Omega$? If yes, then one can skip searching 2 or 3 subregions. Thus, FIG. 10A-10D illustrate the example of a max search using a rolling buffer for roughness computation in accordance with one or more embodiments of the invention. Roughness is computed from FIG. 10A to 10D for the cells in the circle center. FIG. 10A illustrates the initial cell, where max needs to be searched in the shaded region 1002. FIG. 10B illustrates the coordinates stored in the last buffer's entry within the search region so one only needs to search regions 1004. FIG. 10C is similar to FIG. 10B. FIG. 10D illustrates that one only needs to search regions 1004 and 1006.

Landing Site Detection

Robust and safe landing site detection is essential to mitigate the risk of crash landings. Since emergency landings might be required at any time during flight a landing site detection algorithm needs to be efficient enough to run on-board in near real-time.

Landing Requirements/Analysis of Overflows Terrain

Figure 11:
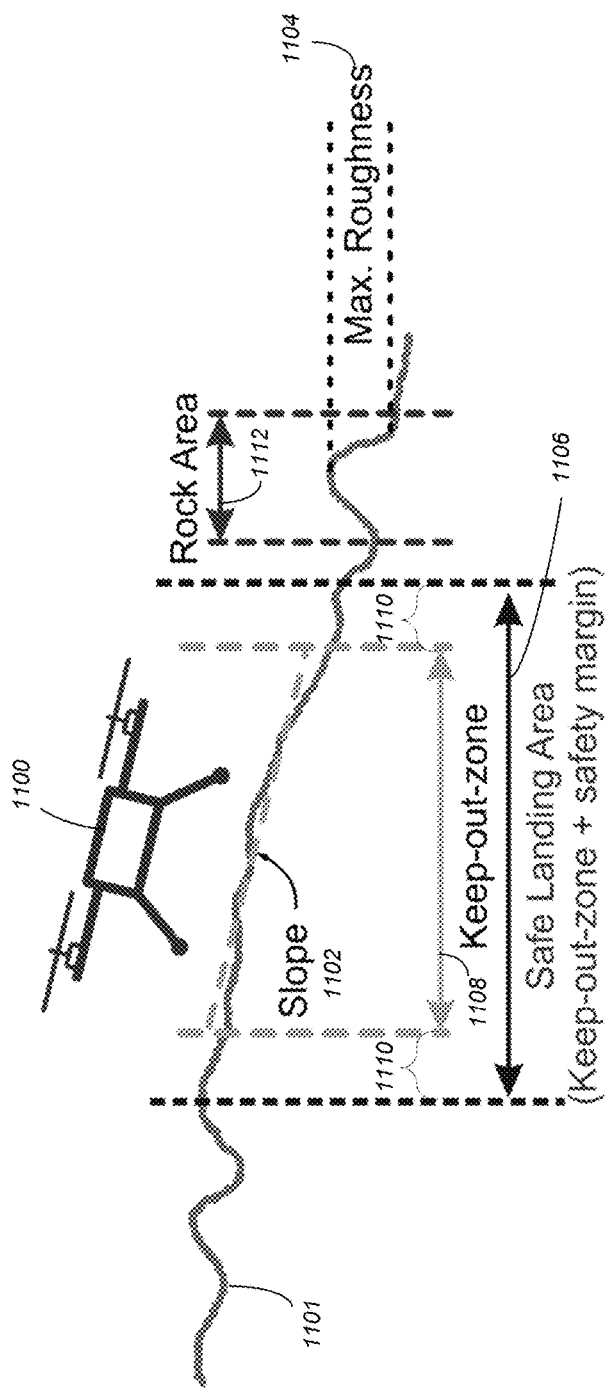
FIG. 11 illustrates landing site selection criteria in accordance with one or more embodiments of the invention.

Several terrain features can become landing hazards to a rotorcraft. Depending on the design, especially of the UAV's landing gear, slopes and objects above a size limit will result in a non-stable landing or even result in damage or crash. Thus, we define a safe landing site to have a local neighborhood of certain radius sufficiently large for descending and landing in which several criteria are fulfilled including an evaluation of the elevation map for slope, rock size, roughness, and confidence in the map reconstruction. FIG. 11 illustrates the landing site selection criteria in accordance with one or more embodiments of the invention.

Referring to FIG. 11, the criteria for safe landing sites for a UAV 1100 are:

Slope 1102: The inclination of the surface is below a maximum threshold.

Roughness 1104: The surface within the landing area is sufficiently flat, respectively free of obstacle including discontinuities caused by rocks Confidence: The landing site is detected with sufficient confidence. If the confidence is low, e.g., because only a few measurements have covered an area on the map, no conclusion can be drawn about the safety of a landing site.

A safe landing area 1106 consists of a keep-out-zone 1108 defined by the size of the UAV and an additional safety margin 1110, which is introduced to alleviate quantization effects of the regular sampled grid.

Evaluation Criteria

The landing site detector (i.e., detector 120 of FIGS. 1 and 2, and landing detection 808 of FIG. 8) analyzes the elevation map in several stages, considering two basic assumptions:

Asm. 1: The slope of the aggregated layers is similar to the slope of the coarsest layer.

Asm. 2: If Asm. 1 does not hold true, the roughness criteria is violated.

Therefore, the detector first evaluates the coarsest layer for slope 1102, and—if successful—then performs a hazard analysis in the finer layers. Further, it is assumed that areas which are unsafe in coarser layers are also not safe in finer layers. Therefore, if an area is declared as unsafe in a coarse layer it is no longer evaluated in subsequent layers, saving computation time. However, since the size of detectable hazards decreases with the resolution increase of finer layers, a coarse-to-fine evaluation of the roughness criteria 1104 is still required. The roughness evaluation 1104 consists of two local neighborhood operators. First, the roughness criteria is verified using a smaller Rock Area 1112 (that depends on the desired minimum rock size—i.e., if there are discontinuities beyond a threshold in the rock area 1112) accounting for abrupt changes around hazards. Second, the complete Safe Landing Area 1106 is verified to be sufficiently planar.

This two step evaluation has the purpose to test if the surface is planar within the landing area allowing a certain slope and if there are discontinuities in a rock area accounting for abrupt changes around hazards. Third, detected landing areas at every layer are evaluated based on a confidence requirement. In other words, after processing each layer, a confidence test invalidates the detected landing area, if the map reconstruction confidence is below a threshold, again, aborting any further evaluation at a finer layer.

The landing site detector result is a binary map which annotates if a map cell is a valid landing site or not. Finally, by applying a distance transform 808A, locations with a maximum distance to any obstacles can be selected and collected in a list of landing site candidates to be considered by the UAV on-board autonomy.

In summary, the landing site detector evaluates the elevation map in several stages. First, the local terrain slope—with respect to the safe landing area 1106 as a reference area—is calculated using a coarse map layer with a pixel footprint (resolution) that corresponds to the footprint of the vehicle 1100. This reduces computational cost, while introducing only minimal error. Second, for areas that pass the slope test, the elevation map is derived at finer resolutions, and from coarse to fine, a roughness operator is applied to estimate terrain discontinuities within the landing area. The roughness operator considers two reference areas: the safe landing area 1106 itself, and a smaller rock area 1112 that depends on the desired minimum rock size.

The areas that pass the landing site detection at the highest resolution available are designated as safe landing areas 1106 and annotated in a binary landing site map. Finally, a list of candidate landing sites is derived by selecting the center location of each landing area patch by applying a distance transform 808A to the binary landing map and selecting the location with the maximum distance to any border as landing site. To save computation time, the landing site detector is initiated by the on-board autonomy. The vehicle autonomy engine can either chose to receive a complete landing site list for the full image, or query a landing site for a specified region, if the vehicle needs to fly back to a previously detected landing site.

Searching for Landing Sites

In a notional autonomy architecture, the landing site detector 808 is complimented by a landing behavior. FIG. 12 illustrates the notional architecture for a landing behavior in accordance with one or more embodiments of the invention. The mission autonomy planner 1202 invokes 1204 the landing site behavior 1206. The landing behavior 1206 is responsible for querying 1208 the landing site detector 1210 and providing motion/mobility commands 1212 to a mobility layer 1214, such as flying to a given waypoint above a selected landing site, and landing the vehicle. Additionally, the landing behavior can survey and select a landing site.

The landing behavior 1206 and the landing site detector 1210 communicate through a query interface 1208. This allows for the decoupling of the landing site detection process from the mapping process within the landing site detector 1210. 3D reconstruction and map aggregation is executed continuously, whereas the map evaluation is triggered by the behavior.

The landing behavior 1206 specifies a circle, with a lateral, X/Y location and radius for potential landing sites and the detector 1210 responds with a list of valid landing sites within the circular region, ordered by their proximity to the X/Y center location. In the case the detector 1210 cannot find a suitable landing site, it informs the landing behavior 1206 about the cause, which can either be because there is not sufficient data for a selection within the defined area, or there is sufficient data, but no valid landing site exists.

The landing behavior 1206 uses this interface to execute a landing maneuver in three distinct cases. In the first case, the landing behavior 1206 tries to land the vehicle at a pre-defined location. At a mission level, it is desirable to specify the landing site of the vehicle. For example, to support a multi-flight transit between two science locations. In this case, the behavior 1206 will first query the detector 1210 for landing sites near the desired landing site. If the vehicle has not yet flown over the desired area, it may be necessary for the behavior 1206 to survey the desired site. In a survey, the landing behavior 1206 flies the vehicle over the desired landing area at a low altitude to gather enough 3D measurements of the area to find suitable landing sites. For this purpose, the behavior 1206 moves throughout the landing area in a lawnmower pattern in order to collect elevation data over the entire desired landing area. It then re-queries 1208 the landing site detector 1210 for landing sites within the desired area. If no landing sites are found, it moves onto the second case.

In the second case, no valid landing sites are available in the desired area. Here, the behavior 1206 needs to select a landing site that has previously been seen during the flight up to this point, including the takeoff point. The behavior 1206 queries 1208 the detector 1210 about its current position with an increased, large radius. It then picks a landing site that is both likely to be valid and is within the remaining performance limits of the vehicle. From this point, the vehicle flies to the new landing site, re-evaluates it if necessary, and lands.

A final case involves an emergency landing. If the vehicle detects an anomalous condition—e.g., an unforeseen battery power drop—an immediate landing, even at a poor landing site, is preferable to crashing. In this case, the landing site behavior 1206 is triggered to request 1208 an emergency landing site from the landing site detector 1210. The detector

1210 responds with the best landing site, even if this site may not normally meet acceptability criteria, and the vehicle immediately navigates to it and lands.

In all of the above cases, the mobility layer 1214 is used to issue flight commands 1216 to the flight controller 1218 which controls the flight of the vehicle.

Improved Landing Site Detection

To detect the safest landing spot, the above described approach may be improved/optimized by introducing a computationally light-weight iterative procedure that selects the location that minimizes the map roughness and uncertainty while maximizing the distance to closest hazards given by the landing segmentation module. Results indicate this improves the landing site selection under mis-segmented hazards.

Thus, embodiments of the invention providing the following to optimize/improve landing site detection:

Faster landing segmentation by using a rolling buffer during the roughness check.

An iterative landing site detection method less sensitive to landing segmentation errors and parameter choices.

Thus, to select the safest landing site location embodiments of the invention aim to maximize the distance from the landing site location to its closest segmented hazard by computing the distance transform [G Borgeforts 1986] from the binary landing segmentation map and then simply select the cell with the largest distance. However, this simple method assumes the segmentation is perfect despite being sensitive to mis-segmented areas due to a fixed roughness threshold. In reality, landings hazards start to disappear (i.e., small size rocks are not detected) as the map resolution decreases. Therefore, embodiments of the invention may utilize a landing site detection method that weights the roughness and uncertainty map.

Referring to FIG. 8, the key idea is to shift the candidate location, to a nearby location that minimizes the roughness and uncertainty within the landing area. This is done by running a Mean Shift algorithm 808C that computes the shifted mean (location) using:

$$u_{t+1} = \frac{1}{\sum_{i \in \Omega} K(\phi(p_i))} \sum_{i \in \Omega} K(\phi(p_i)) p_i$$

where $\Omega$ is the sampled region around the current location u_t$, $\phi(p_i)$ is the projection of cell's coordinates $p_i$ into feature space (e.g., roughness) and K is a Gaussian Kernel:

$$K(x) = e^{-x^T \Lambda x}$$

where $\Lambda$ is a diagonal matrix containing feature weights. In embodiments of the invention, $\phi(p_i) = [R_i, 1-D_i, \sigma_i]$ is used where $R_i$, $D_i$ are respectively the roughness and the normalized distance transform (i.e. $D \in [0,1]$) at the ith cell.

Embedding the distance in the feature space acts as a regularization to prevent moving too far from the distance transform ridge, as shown in FIG. 7. Once $u_{t+1}$ is calculated, $\Omega$ is sampled again and the process is repeated for a few iterations.

Because the mean shift is prone to local minima and one might have separate safe landing regions with similar distance transforms, embodiments of the invention perform first a multiple peak detection 808B on the distance transform 808A and then do the Mean Shift 808C operation individually for each peak. The peak detection 808B uses Non-Maximum Suppression and selects up to N peaks that are at least larger than the largest peak down-scaled by a factor. Then an OMG is fit to the landing area using $S_{A+B}$, $\mu_{A+B}$, and $\sigma_{A+B}^2$ around each peak using the uncertainty map, and finally, the landing spot is selected that has the smallest OMG variance.

Logical Flow

Figure 13:
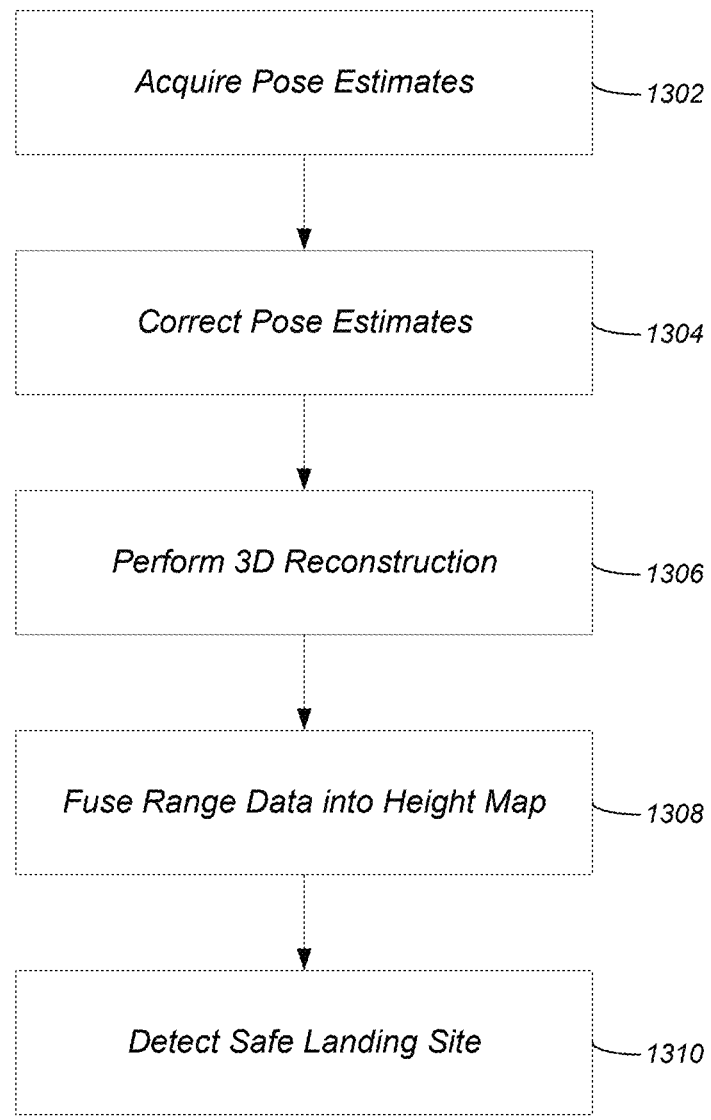
FIG. 13 illustrates the logical flow for autonomously detecting unmanned aerial vehicle (UAV) landing sites in accordance with one or more embodiments of the invention.

FIG. 13 illustrates the logical flow for autonomously detecting unmanned aerial vehicle (UAV) landing sites in accordance with one or more embodiments of the invention. In particular, FIG. 13 illustrates the process for performing 3D reconstruction of overflows terrain with a monocular camera (structure from motion).

At step 1302, the UAV autonomously acquires pose estimates from an on-board visual-inertial-range odometry method (via an on-board pose estimator) during flight. Such on-board pose estimates are utilized in the 3D reconstruction process as a pose prior and to regain metric scale. Since pose estimates (from the odometry method/algorithm) are not accurate enough to perform image-based 3D reconstruction (correlation of pixel intensities) a pose refinement step improves the pose priors in a correction step 1304. The on-board pose estimator deploys a GPS-inertial odometry method that utilizes GPS positions for flights where GPS signals are available.

At step 1304, the on-board pose estimates are corrected/updated based on a bundle adjustment approach. Such a bundle adjustment approach is based on three or more keyframes (i.e., three or more previously acquired images and corresponding poses from the on-board pose estimator). In this regard, the bundle adjustment approach uses feature matches and initial poses in a sliding window approach using past keyframes and the most current image.

At step 1306, 3D reconstruction is performed based on multiple captured images taken from an on-board camera. Embodiments of the invention may follow two general approaches. In a first approach, a pair of captured images is selected from the keyframe buffer, based on the distance between the camera origins (baseline) and image overlap. Further, in such embodiments, the 3D reconstruction may include rectification (i.e., alignment for stereo processing), followed by the calculation of 3D data based on the rectified selected multiple images/image pairs. Such 3D data consists of a disparity map and the corresponding range data. In this regard, a conventional stereo algorithm may be used to calculate the 3D data resulting in an increase in efficiency. Thereafter, the range data may be provided as a range image. For the range image, each pixel of a most current image is associated with a 3D point in the range data (i.e., an ordered point cloud).

In a second approach, more than two (of the) multiple captured images are selected and the 3D reconstruction consists of multi-image 3D reconstruction.

At step 1308, range data (from the multiple captured images) is fused into a multi-resolution height map. In one or more embodiments, the 3D data is associated to a pixel footprint that corresponds to a footprint of the corresponding pixel on the measured/overflown terrain surface. The fusion consists of (i) selecting a level-of-detail (LOD) of the multi-resolution height map using the pixel footprint, (ii) fusing a height measurement of the pixel with map cell data in the selected LOD, (iii) repeating steps (i) and (ii) until all measurements from the most current image are incorporated into the multi-resolution height map. Once map fusion is complete, the multi-resolution map is updated using a pooling operation such that all LOD levels have a correct current height estimate. At this point, the multi-resolution height map can be queried for different resolutions.

The fusion process 1308 enables a hierarchical approach to identify landing hazards. For example, a first landing hazard may be detected at a lower resolution level of the multi-resolution map when the UAV is unable to perceive a second landing hazard at a higher resolution level of the multi-resolution map (wherein the first landing hazard is larger than the second landing hazard). In other words, if the UAV is unable to perceive a 3D measurement at high resolution map layers due to an increased altitude, and thus does not perceive small landing hazards at this high resolution level of the multi-resolution map, a larger landing hazard still may be detected (e.g., by the UAV) in a lower resolution level. In other words, if the UAV is too far away from the ground to perceive small landing hazards, large hazards can be detected in lower resolution levels of the map instead. Thereafter, once the UAV flies lower, the fine resolution layers are updated enabling detection of small landing hazards at the finest scale.

In addition to the above, to optimize terrain mapping, the map fusion may consist of an Optimal Mixture of Gaussians approach. Such a mixture of Gaussians approach is based on an uncertainty model that is within a threshold level of accuracy (i.e., the uncertainty model/estimate is more accurate than a conventional sensor fusion uncertainty model/estimate). In this regard, conventional approaches that use Kalman filters lead to inferior uncertainty estimation/models. Further, the mixture of Gaussian approach decouples a fusion of single-layer measurements and updating other layers of the multi-resolution height map by a pooling operation (i.e., pyramid pooling (thereby increasing efficiency)).

In one or more embodiments, the multi-resolution height map is anchored within a global frame, but travels with the UAV. Such an approach guarantees a fixed memory footprint, which is important for an embedded system with limited computational resources. Further, embodiments of the invention may utilize a rolling buffer implementation where one or more image pairs flows into and out of the multi-resolution height map. In this regard, new data may flow into the map in areas previously not seen, while old data flows out of the map and is forgotten. In alternative embodiments, the multi-resolution height map may be anchored and fixed within a global frame.

At step 1310, a safe landing site is detected based on the multi-resolution height map. Such detecting may be based on hazards (e.g., rocks), surface roughness, slope, uncertainty, and sufficient space for the UAV.

In one or more embodiments, the landing site detection 1310 filters the multi-resolution height map to produce candidate safe landing areas using a binary filter that filters for different hazard categories (i.e., landing segmentation). Thereafter, a landing location/point in the safest landing area is selected. To select a landing point, a single resolution safe landing area map is produced based on the candidate safe landing areas. The candidate safe landing areas undergo a distance transform to identify the center of large safe landing areas as candidate landing sites. The final landing site is then selected from the candidate landing sites based on a size of the surrounding safe landing area (i.e., based on a size of the candidate safe landing area that surrounds each candidate landing site). The final landing site is then improved by shifting a location of the final landing site based on an estimated roughness of the terrain around the final landing site.

UAV Computer

Figure 14:
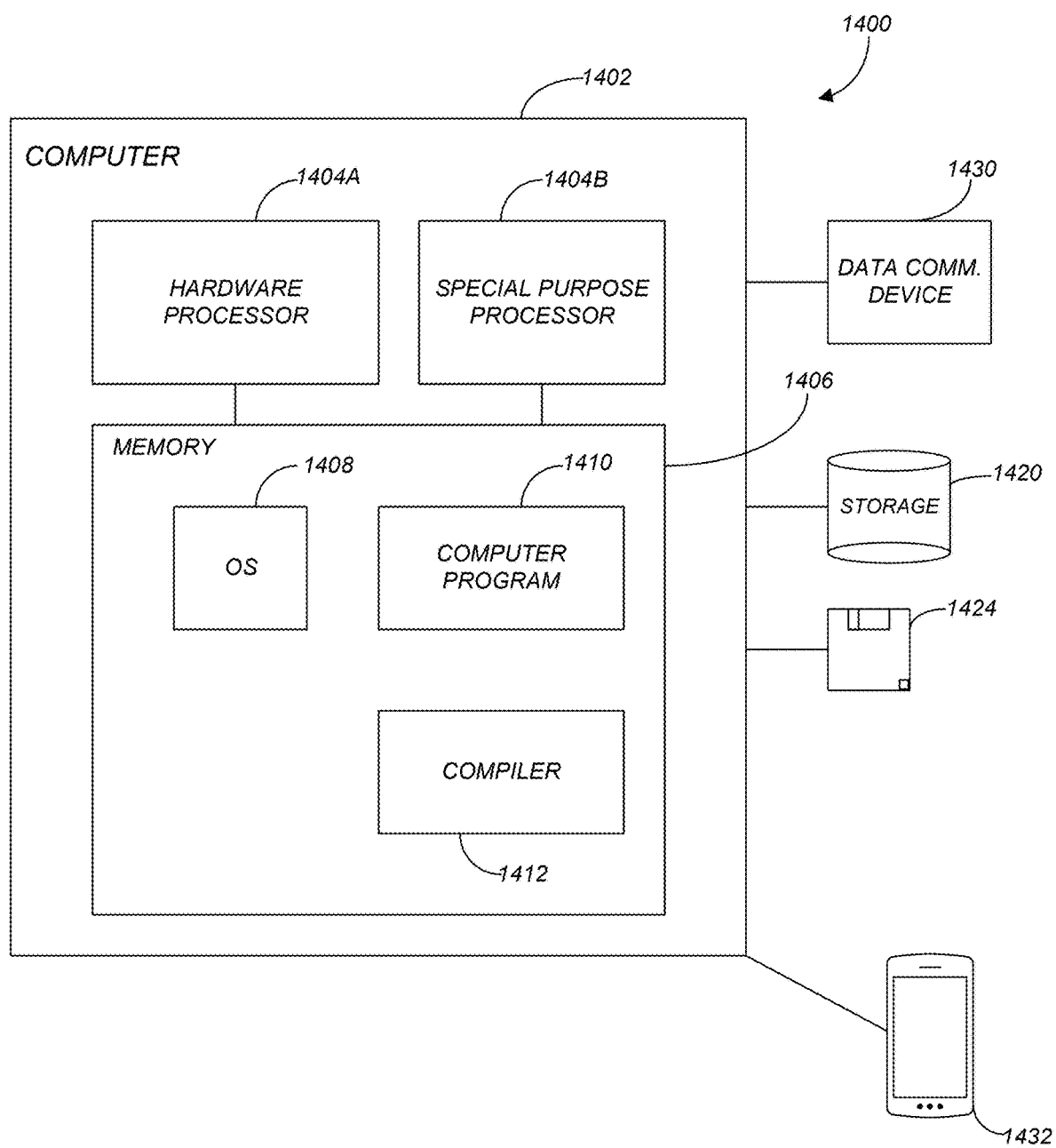
FIG. 14 is an exemplary hardware and software environment used to implement a computer in accordance with one or more embodiments of the invention.

Embodiments of the invention may utilize/include a computer on-board the UAV. FIG. 14 is an exemplary hardware and software environment 1400 (referred to as a computer-implemented system and/or computer-implemented method) used to implement such a computer. The hardware and software environment includes a computer 1402 and may include peripherals. Computer 1402 may be a user/client computer, server computer, or may be a database computer. The computer 1402 comprises a hardware processor 1404A and/or a special purpose hardware processor 1404B (hereinafter alternatively collectively referred to as processor 1404) and a memory 1406, such as random access memory (RAM). The computer 1402 may be coupled to, and/or integrated with, other devices, including input/output (I/O) devices. In one or more embodiments, computer 1402 may be coupled to, or may comprise, a cellular device 1432 or other communication device.

In one embodiment, the computer 1402 operates by the hardware processor 1404A performing instructions defined by the computer program 1410 (e.g., an elevation mapping application, a dense depth estimation application, a landing segmentation application, a landing site detection application, etc.) under control of an operating system 1408. The computer program 1410 and/or the operating system 1408 may be stored in the memory 1406 and may interface with the user and/or other devices to accept input and commands and, based on such input and commands and the instructions defined by the computer program 1410 and operating system 1408, to provide output and results.

Some or all of the operations performed by the computer 1402 according to the computer program 1410 instructions may be implemented in a special purpose processor 1404B. In this embodiment, some or all of the computer program 1410 instructions may be implemented via firmware instructions stored in a read only memory (ROM), a programmable read only memory (PROM) or flash memory within the special purpose processor 1404B or in memory 1406. The special purpose processor 1404B may also be hardwired through circuit design to perform some or all of the operations to implement the present invention. Further, the special purpose processor 1404B may be a hybrid processor, which includes dedicated circuitry for performing a subset of functions, and other circuits for performing more general functions such as responding to computer program 1410 instructions. In one embodiment, the special purpose processor 1404B is an application specific integrated circuit (ASIC).

The computer 1402 may also implement a compiler 1412 that allows an application or computer program 1410 written in a programming language such as C, C++, Assembly, SQL, PYTHON, PROLOG, MATLAB, RUBY, RAILS, HASKELL, or other language to be translated into processor 1404 readable code. Alternatively, the compiler 1412 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1410 accesses and manipulates data accepted from I/O devices and stored in the memory 1406 of the computer 1402 using the relationships and logic that were generated using the compiler 1412.

The computer 1402 also optionally comprises an external communication device such as a modem, satellite link, Ethernet card, or other device for accepting input from, and providing output to, other computers 1402 and/or the UAS.

In one embodiment, instructions implementing the operating system 1408, the computer program 1410, and the compiler 1412 are tangibly embodied in a non-transitory computer-readable medium, e.g., data storage device 1420, which could include one or more fixed or removable data storage devices, such as a zip drive, floppy disc drive 1424, hard drive, CD-ROM drive, tape drive, etc. Further, the operating system 1408 and the computer program 1410 are comprised of computer program 1410 instructions which, when accessed, read and executed by the computer 1402, cause the computer 1402 to perform the steps necessary to implement and/or use the present invention or to load the program of instructions into a memory 1406, thus creating a special purpose data structure causing the computer 1402 to operate as a specially programmed computer executing the method steps described herein.

Computer program 1410 and/or operating instructions may also be tangibly embodied in memory 1406 and/or data communications devices 1430, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1402.

Figure 15:
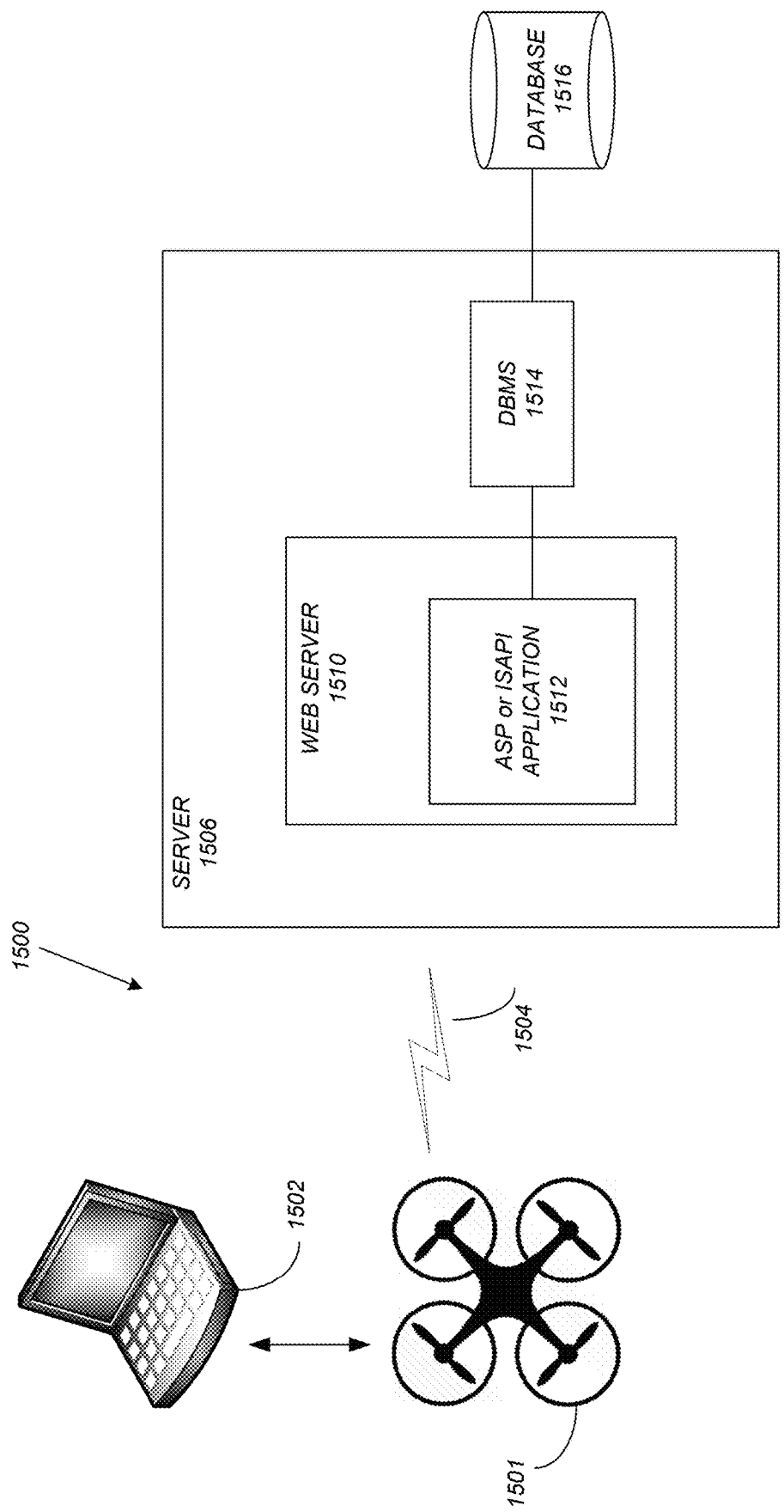
FIG. 15 schematically illustrates a typical distributed/cloud-based computer system in accordance with one or more embodiments of the invention.

FIG. 15 schematically illustrates a typical distributed/cloud-based computer system 1500 using a network 1504 to connect client computers 1502 (which may be laptop computer, desktop computers, etc.), (which may be incorporated within a UAV 1501) to server computers 1506 and/or to each other. A typical combination of resources may include a network 1504 comprising the Internet, LANs (local area networks), WANs (wide area networks), SNA (systems network architecture) networks, or the like, clients 1502 that are personal computers, workstations, and/or are integrated into UAVs (as set forth in FIG. 14), and servers 1506 that are personal computers, workstations, minicomputers, or mainframes (as set forth in FIG. 14). However, it may be noted that different networks such as a cellular network (e.g., GSM [global system for mobile communications] or otherwise), a satellite based network, or any other type of network may be used to connect clients 1502 and servers 1506 in accordance with embodiments of the invention.

A network 1504 such as the Internet connects clients 1502 to server computers 1506. Network 1504 may utilize ethernet, coaxial cable, wireless communications, radio frequency (RF), etc. to connect and provide the communication between clients 1502 and servers 1506. Further, in a cloud-based computing system, resources (e.g., storage, processors, applications, memory, infrastructure, etc.) in clients 1502 and server computers 1506 may be shared by clients 1502, server computers 1506, and users across one or more networks.

Resources may be shared by multiple users and can be dynamically reallocated per demand. In this regard, cloud computing may be referred to as a model for enabling access to a shared pool of configurable computing resources.

Clients 1502 may execute a client application or web browser and communicate with server computers 1506 executing web servers 1510. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1502 may be downloaded from server computer 1506 to client computers 1502 and installed as a plug-in or ACTIVEX control of a web browser. Accordingly, clients 1502 may utilize ACTIVEX components/component object model (COM) or distributed COM (DCOM) components to provide a user interface on a display of client 1502. The web server 1510 is typically a program such as MICROSOFT'S INTERNET INFORMATION SERVER.

Web server 1510 may host an Active Server Page (ASP) or Internet Server Application Programming Interface (ISAPI) application 1512, which may be executing scripts. The scripts invoke objects that execute business logic (referred to as business objects). The business objects then manipulate data in database 1516 through a database management system (DBMS) 1514. Alternatively, database 1516 may be part of, or connected directly to, client 1502 instead of communicating/obtaining the information from database 1516 across network 1504. When a developer encapsulates the business functionality into objects, the system may be referred to as a component object model (COM) system. Accordingly, the scripts executing on web server 1510 (and/or application 1512) invoke COM objects that implement the business logic. Further, server 1506 may utilize MICROSOFT'S TRANSACTION SERVER (MTS) to access required data stored in database 1516 via an interface such as ADO (Active Data Objects), OLE DB (Object Linking and Embedding DataBase), or ODBC (Open DataBase Connectivity).

Generally, these components 1500-1516 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1502 and 1506 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1502 and 1506. Embodiments of the invention are implemented as a software/CAD application on a client 1502 or server computer 1506. Further, as described above, the client 1502 or server computer 1506 may comprise a thin client device or a portable device that has a multi-touch-based display.

CONCLUSION

This concludes the description of the preferred embodiment of the invention. In particular embodiments of the invention provide a framework to autonomously detect safe landing sites on-board a future planetary rotorcraft with limited size, weight and power resources. The elevation mapping approach is capable of incrementally modelling a surface by processing vision-based 3D measurements with multiple resolutions in a dynamic Level of Detail approach. While being memory and computationally efficient, the multi-resolution map refines a coarse terrain approximation with local high-resolution information. The presented landing site detector exploits the multi-resolution structure of the representation of the environment and allows a fast and efficient detection of safe landing site.

It may be noted that the multi-resolution mapping approach is advantageous in 3D terrain with various elevations, or for cameras mounted with an oblique angle, where embodiments of the invention allow the creation of a highly detailed map close to the vehicle and a coarse map further away or in areas with less dense measurements.

The framework was tested on various simulated and real environments, validating the feasibility and robustness of our vision-based methods.

Further to the above, embodiments of the invention provide an advanced navigation module for a future Mars rotorcraft to autonomously detect landing hazards during flight. The approach leverages existing sensor data and data processing products to minimize impact on size weight and power. The module was tested on various simulated and real environments, demonstrating the feasibility of a vision-based perception approach for safe landing site detection. The landing site detection navigation module is available for surrogate Mars Science Helicopter avionics hardware for on-board execution in near real-time with a target execution frame rate of 1-Hz.

In addition, embodiments of the invention enable efficiently multiresolution height mapping, landing segmentation and detection while not sacrificing accuracy. Further embodiments may also provide for landing site selection that takes into account path planning and a multi-view stereo for general motion. Moreover, embodiments of the invention may be utilized to map sizes close to the camera FOV.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[J Balaram 2018] J. Balaram, T. Canham, C. Duncan, H. Grip, W. Johnson, J. Maki, A. Quon, R. Stem, and D. Zhu, "Mars Helicopter Technology Demonstrator", AIAA SciTech Forum, 2018.

[W Johnson 2020] W. Johnson, S. Withrow, L. Young, W. Koning, W. Kuang, C. Malpica, J. Balaram and T. Tzanetos, "Mars Science Helicopter Conceptual Design", AIAA Ascend 2020.

[D Bayard 2019] D. Bayard, D. Conway, R. Brockers, J. Delaune, L. Matthies, H. Grip, G. B. Merewether, T. L. Brown and A. M. San Martin, "Vision-Based Navigation for the NASA Mars Helicopter", AIAA Scitech Forum, 2019.

[S Saripalli 2002] S. Saripalli, J. F. Montgomery, and G. S. Sukhatme, "Vision-based autonomous landing of an unmanned aerial vehicle," in IEEE International Conference on Robotics and Automation (ICRA), vol. 3, 2002.

[D Falanga 2017] D. Falanga, A. Zanchettin, A. Simovic, J. Delmerico, and D. Scaramuzza, "Vision-based autonomous quadrotor landing on a moving platform", in Proceedings of the IEEE International Symposium on Safety, Security and Rescue Robotics, Shanghai, China, 2017.

[S Bosch 2006] S. Bosch, S. Lacroix and F. Caballero, "Autonomous Detection of Safe Landing Areas for an UAV from Monocular Images," in IEEE/RSJ International Conference on Intelligent Robots and Systems, Beijing, 2006.

[R Brockers 2011] R. Brockers, P. Bouffard, J. Ma, L. Matthies, and C. Tomlin, "Autonomous landing and ingress of micro-air-vehicles in urban environments based on monocular vision", in SPIE Defense, Security and Sensing, 2011.

[V Desaraju 2015] V. Desaraju, M. Humenberger, N. Michael, R. Brockers, S. Weiss and L. Matthies, "Vision-based Landing Site Evaluation and Trajectory Generation Toward Rooftop Landing", in Autonomous Robots, vol 39, no. 3, pp. 445-463, 2015.

[R Brockers 2014] R. Brockers, M. Hummenberger, S. Weiss and L. Matthies, "Towards Autonomous Navigation of Miniature UAV," in IEEE Conference on Computer Vision and Pattern Recognition Workshops, pp. 645-651, 2014.

[N Trawny 2015] N. Trawny, A. Huertas, M. Luna, C. Villalpando, K. Martin, J. Carson and A. Johnson, "Flight testing a real-time hazard detection system for safe lunar landing on the rocket-powered mopheus vehicle", in Proc. AIAA SciTech Conference, 2015.

[M Luna 2017] M. Luna, E. Almeida, G. Spiers, C. Villalpando, A. Johnson, and N. Trawny, "Evaluation of the Simple Safe Site Selection (S4) Hazard Detection Algorithm using Helicopter Field Test Data", in AIAA Guidance, Navigation, and Control Conference, 2017.

[A Johnson 2002] A. Johnson, A. Klumpp, J. Collier, and A. Wolf, "Lidar-based hazard avoidance for safe landing on mars," AIAA Jour. in Guidance, Control and Dynamics, vol. 25, no. 5, 2002.

[S Scherer 2012] S. Scherer, L. Chamberlain, and S. Singh, "Autonomous landing at unprepared sites by a full-scale helicopter", in Journal of Robotics and Autonomous Systems, 2012.

[A Johnson 2020] A. Johnson, N. Villaume, C. Umsted, A. Kourchians, D. Sternberg, N. Trawny, Y. Cheng, E. Giepel, and J. Montgomery, "The Mars 2020 lander vision system field test", in Proc. AAS Guidance Navigation and Control Conference (AAS-20-105), 2020.

[A Johnson 2005] A. Johnson, J. Montgomery, and L. Matthies, "Vision guided landing of an autonomous helicopter in hazardous terrain", in IEEE Intl. Conf. on Robotics and Automation (ICRA), 2005.

[P Fankhauser 2014] P. Fankhauser, M. Bloesch, C. Gehring, M. Hutter, and R. Siegwart, "Robot-centric elevation mapping with uncertainty estimates," in International Conference on Climbing and Walking Robots (CLAWAR), 2014.

[C Forster 2015] C. Forster, M. Faessler, F. Fontana, M. Werlberger and D. Scaramuzza, "Continuous on-board monocular-vision based elevation mapping applied to autonomous landing of micro aerial vehicles", in IEEE International Conference on Robotics and Automation (ICRA), 2015.

[S Daftry 2018] S. Daftry, M. Das, J. Delaune, C. Sorice, R. Hewitt, S. Reddy, D. Lytle, E. Gu and L. Matthies, "Robust Vision-based Autonomous Navigation, Mapping and Landing for MAVs at Night", in International Symposium on Experimental Robotics (ISER), 2018.

[J Zienkiewicz 2016] J. Zienkiewicz, A. Tsiotsios, A. Davison and S. Leutenegger, "Monocular, Real-Time Surface Reconstruction Using Dynamic Level of Detail," in Fourth International Conference on 3D Vision (3DV), pp. 37-46, 2016.

[J Delaune 2020]J. Delaune, R. Brockers, D. S. Bayard, H. Dor, R. Hewitt, J. Sawoniewicz, G. Kubiak, T. Tzanetos, L. Matthies and J. Balaram, "Extended Navigation Capabilities for a Future Mars Science Helicopter Concept", in IEEE Aerospace Conference, 2020.

[M Domnik 2021]M. Domnik, P. Proenca, J. Delaune, J. Thiem and R. Brockers, "Dense 3D-Reconstruction from Monocular Image Sequences for Computationally Constrained UAS", in IEEE Winter Conference on Applications of Computer Vision (WACV), 2021.

[SB Goldberg 2002]S. B. Goldberg, M. Maimone and L. Matthies, "Stereo vision and rover navigation software for planetary exploration", in IEEE Aerospace Conference, 2002.

[P Burt 1983]P. Burt, E. Adelson, "The Laplacian Pyramid as a Compact Image Code," in IEEE Transactions on Communications, vol. 31, no. 4, pp. 532-540, 1983.

[M Herbert 1989]M. Herbert, C. Caillas, E. Krotkov, I. S. Kweon and T. Kanade, "Terrain mapping for a roving planetary explorer," in Proceedings of the International Conference on Robotics and Automation, pp. 997-1002, 1989.

[M Muser 2017]M. Muser, W. Dapp, Wolf, R. Bugnicourt, P. Sainsot, N. Lesaffre, T. Lubrecht, B. Persson, K. Harris, A. Bennett, K. Schulze, S. Rohde, P. Ifju, T. Angelini, H. Esfahani, M. Kadkhodaei, S. Akbarzadeh, J. Wu, G. Vorlaufer and J. Greenwood, "Meeting the Contact-Mechanics Challenge.", in Tribology Letters, 2017.

[A Jain 2019] A. Jain, "DARTS—Multibody Modeling, Simulation and Analysis Software", in Multibody Dynamics 2019. Springer International Publishing, p. 433-441, 2019.

[J Bapst 2020]J. Bapst et al., "Mars science helicopter: Compelling science enabled by an aerial platform," accessed: 2020-10-15. [Online]. Available: https://mep-ag.jpl.nasa.gov/reports/decadal2023-2032/MSH whitepaper draft final 20copy.pdf.

[H Grip 2019]H. Grip, J. Lam, D. Bayard, D. Conway, G. Singh, R. Brockers, J. Delaune, L. Matthies, C. Malpica, T. Brown, A. Jain, A. San Martin, and G. Merewether, "Flight Control System for NASA's Mars Helicopter," in AIAA Scitech Forum, 2019.

[J Engel 2018]J. Engel, V. Koltun, and D. Cremers, "Direct sparse odometry," IEEE Transactions on Pattern Analysis and Machine Intelligence, March 2018.

[J Engel 2014]J. Engel, T. Sch¨ ops, and D. Cremers, "LSD-SLAM: Large-scale direct monocular SLAM," in European Conference on Computer Vision (ECCV), 2014.

[J Zienkiewicz 2014]J. Zienkiewicz, A. Tsiotsios, A. Davison, and S. Leutenegger, "Monocular, real-time surface reconstruction using dynamic level of detail," in Fourth International Conference on 3D Vision (3DV), 2014.

[T Schneider 2018]T. Schneider, M. Dymczyk, M. Fehr, K. Egger, S. Lynen, I. Gilitschenski, and R. Siegwart, "An open framework for research in visual inertial mapping and localization," RA-L, vol. 3, no. 3, 2018.

[M Pizzoli 2014]M. Pizzoli, C. Forster, and D. Scaramuzza, "Remode: Probabilistic, monocular dense reconstruction in real time," in ICRA, 2014.

[IS Kweon 1989]I.-S. Kweon, M. Hebert, E. Krotkov, and T. Kanade, "Terrain mapping for a roving planetary explorer," in IEEE International Conference on Robotics and Automation, 1989.

[P Proenca 2018]P. F. Proenga and Y. Gao, "Probabilistic rgb-d odometry based on points, lines and planes under depth uncertainty," Robotics and Autonomous Systems, 2018.

[A Johnson 2017] A. Johnson, S. Aaron, J. Chang, Y. Cheng, J. Montgomery, S. Mohan, S. Schroeder, B. Tweddle, N. Trawny, and J. Zheng, "The lander vision system for mars 2020 entry descent and landing," 2017.

[P Fankhauser 2016]P. Fankhauser and M. Hutter, "A universal grid map library: Implementation and use case for rough terrain navigation," in Robot Operating System (ROS), pp. 99-120, Springer, 2016.

[R Triebel 2006]R. Triebel, P. Pfaff, and W. Burgard, "Multilevel surface maps for outdoor terrain mapping and loop closing," in IEEE/RSJ International Conference on Intelligent Robots and Systems, pp. 2276-2282, 2006.

[T Hinzmann 2018]T. Hinzmann, T. Stastny, C. Cadena, R. Siegwart, and I. Gilitschenski, "Free lsd: prior-free visual landing site detection for autonomous planes," IEEE Robotics and Automation Letters, vol. 3, no. 3, pp. 2545-2552, 2018.

[M Warren 2015]M. Warren, L. Mejias, X. Yang, B. Arain, F. Gonzalez, and B. Upcroft, "Enabling aircraft emergency landings using active visual site detection," in Field and Service Robotics, pp. 167-181, Springer, 2015.

[S Vasudevan 2009]S. Vasudevan, F. Ramos, E. Nettleton, and H. Durrant-Whyte, "Gaussian process modeling of large-scale terrain," Journal of Field Robotics, vol. 26, no. 10, 2009.

[M Popovic 2017]M. Popovi'c, T. Vidal-Calleja, G. Hitz, I. Sa, R. Siegwart, and J. Nieto, "Multiresolution mapping and informative path planning for uav-based terrain monitoring," in 2017 IEEE/RSJ International Conference on Intelligent Robots and Systems (IROS), pp. 1382-1388, IEEE, 2017.

[G Borgefors 1986]G. Borgefors, "Distance transformations in digital images," Computer vision, graphics, and image processing, vol. 34, no. 3, pp. 344-371, 1986.

[S Shah 2018]S. Shah, D. Dey, C. Lovett, and A. Kapoor, "Airsim: High-fidelity visual and physical simulation for autonomous vehicles," in Field and service robotics, pp. 621-635, Springer, 2018.

What is claimed is:

1. A method for autonomously detecting unmanned aerial vehicle (UAV) landing sites, comprising:
   (a) the UAV autonomously acquiring pose estimates from an on-board visual-inertial-range odometry method via an on-board pose estimator during flight, wherein the on-board pose estimates are utilized as a pose prior and to regain metric scale during three-dimensional (3D) reconstruction;
   (b) performing, onboard the UAV during flight, 3D reconstruction based on multiple captured images taken from an on-board camera during flight, wherein the 3D reconstruction generates range data from the multiple captured images, wherein multiple 3D reconstructions are performed onboard the UAV during flight;
   (c) fusing, onboard the UAV during flight, range data from the multiple captured images into a multi-resolution height map whenever new range data becomes available, wherein the multi-resolution height map comprises different resolution layers wherein range measurements are inserted based on a measurement resolution represented by a pixel footprint of the 3D reconstruction; and
   (d) detecting, onboard the UAV during flight, a safe landing site on the terrain based on the multi-resolution height map and an evaluation that uses the different resolution layers for detecting hazards of different sizes, wherein the detecting selects one of the different resolution layers based on a hazard size.

2. The method of claim 1, wherein the on-board pose estimates from the visual-inertial-range odometry method are not accurate enough to perform image-based 3D reconstruction.

3. The method of claim 1, further comprising correcting the on-board pose estimates based on a bundle adjustment approach, wherein the bundle adjustment approach:
 is based on three or more previously acquired images and corresponding poses from the on-board pose estimator; and
 uses feature matches and initial poses in a sliding window approach using past keyframes and the most current image.

4. The method of claim 1, wherein the performing 3D reconstruction comprises:
 selecting the multiple captured images from a keyframe buffer;
 rectifying the selected multiple captured images;
 calculating 3D data based on the rectified selected multiple captured images, wherein the 3D data comprises a disparity map and the range data; and
 providing the range data as a range image, wherein each pixel of a most current image, of the rectified selected multiple captured images, is associated with a 3D point in the range data.

5. The method of claim 4, wherein:
 the 3D data is associated to a pixel footprint that corresponds to a footprint of a pixel on overflown terrain; and
 the fusing comprises:
  (i) selecting a level-of-detail (LOD) of the multi-resolution height map using the pixel footprint;
  (ii) fusing a height measurement with map cell data in the selected LOD;
  (iii) repeating steps (i) and (ii) until all measurements from the most current image are incorporated into the multi-resolution height map; and
  (iv) updating the multi-resolution map using a pooling operation, such that all LOD levels have a correct current height estimate.

6. The method of claim 5, wherein:
 the fusing enables a hierarchical approach to finding a landing hazard;
 the fusing enables detection of a first landing hazard at a lower resolution level of the multi-resolution height map;
 the UAV is unable to perceive a second landing hazard at a higher resolution of the multi-resolution height map; and
 the first landing hazard is larger than the second landing hazard.

7. The method of claim 1, wherein:
 the performing 3D reconstruction comprises selecting more than two multiple captured images; and
 the 3D reconstruction comprises multi-image 3D reconstruction.

8. The method of claim 1, wherein:
 the fusing comprises a mixture of Gaussian approach.

9. The method of claim 8, wherein:
 the mixture of Gaussian approach is based on an uncertainty model that is within a threshold level of accuracy; and
 the mixture of Gaussian approach decouples a fusion of single-layer measurements and updating other layers of the multi-resolution height map by a pooling operation.

10. The method of claim 1, wherein:
 the multi-resolution height map is anchored within a global frame;
 the multi-resolution height map travels with the UAV; and
 image data from the selected multiple images flows into and out of the multi-resolution height map using a rolling buffer.

11. The method of claim 1, wherein:
 the multi-resolution height map is anchored and fixed within a global frame.

12. The method of claim 1, wherein the detecting is based on:
 surface roughness;
 slope;
 uncertainty; and
 sufficient space for the UAV.

13. The method of claim 1, wherein the detecting:
 filters the multi-resolution height map to produce candidate safe landing areas using a filter that filters for different hazard categories; and
 selects a landing point in a safe area by:
  producing a single resolution safe landing area map based on the candidate safe landing areas;
  applying a distance transform to identify a center of the candidate safe landing areas, from the safe landing area map, as candidate landing sites;
  selecting a final landing site from the candidate landing sites based on a size of the candidate safe landing area that surrounds each candidate landing site;
  improving the final landing site by shifting a location of the final landing site based on an estimated roughness of terrain around the final landing site.

14. An unmanned aerial vehicle (UAV) comprising:
(a) an on-board camera that captures multiple captured images;
(b) an on-board pose estimator that:
 (i) deploys a visual-inertial-range odometry method that utilizes images acquired during flight for flights in GPS-denied environments;
 (ii) deploys a GPS-inertial odometry method that utilizes global positioning system positions for flights where GPS signals are available;
 (iii) acquires on-board pose estimates, wherein the on-board pose estimates are utilized as a pose prior and to regain metric scale during three-dimensional (3D) reconstruction;
(e) a processor;
(f) software executed by the processor, wherein the software causes the UAV to autonomously:
 (i) perform, onboard the UAV during flight, 3D reconstruction based on the multiple captured images taken from the on-board camera during flight, wherein the 3D reconstruction generates range data from the multiple captured images, wherein multiple 3D reconstructions are performed onboard the UAV during flight;
 (iii) fuse, onboard the UAV during flight, range data from the multiple captured images into a multi-resolution height map whenever new range data becomes available, wherein the multi-resolution height map comprises different resolution layers wherein range measurements are inserted based on a measurement resolution represented by a pixel footprint of the 3D reconstruction; and (iv) detect, onboard the UAV during flight, a safe landing site on the terrain based on the multi-resolution height map and an evaluation that uses the different resolution layers for detecting hazards of different sizes, wherein the detecting selects one of the different resolution layers based on a hazard size.

15. The UAV of claim 14, wherein the on-board pose estimates from the visual-inertial-range odometry method are not accurate enough to perform image-based 3D reconstruction.

16. The UAV of claim 14, the UAV further autonomously corrects the on-board pose estimates based on a bundle adjustment approach, wherein the bundle adjustment approach:
is based on three or more previously acquired images and corresponding poses from the on-board pose estimator; and
uses feature matches and initial poses in a sliding window approach using past keyframes and the most current image.

17. The UAV of claim 14, wherein the software performs the 3D reconstruction by:
selecting the multiple captured images from a keyframe buffer;
rectifying the selected multiple captured images;
calculating 3D data based on the rectified selected multiple captured images, wherein the 3D data comprises a disparity map and the range data; and
providing the range data as a range image, wherein each pixel of a most current image, of the rectified selected multiple captured images, is associated with a 3D point in the range data.

18. The UAV of claim 17, wherein:
the 3D data is associated to a pixel footprint that corresponds to footprint of a pixel on overflown terrain; and
the software fuses 3D data with the multi-resolution height map by:
  (i) selecting a level-of-detail (LOD) of the multi-resolution height map using the pixel footprint;
  (ii) fusing a height measurement with map cell data in the selected LOD;
  (iii) repeating steps (i) and (ii) until all measurements from the most current image are incorporated into the multi-resolution height map; and
  (iv) updating the multi-resolution map using a pooling operation, such that all LOD levels have a correct current height estimate.

19. The UAV of claim 18, wherein:
the software fusing enables a hierarchical approach to finding a landing hazard;
the software fusing enables detection of a first landing hazard at a lower resolution level of the multi-resolution height map;
the UAV is unable to perceive a second landing hazard at a higher resolution of the multi-resolution height map; and
the first landing hazard is larger than the second landing hazard.

20. The UAV of claim 17, wherein:
the software performs the 3D reconstruction by selecting more than two multiple captured images; and
the 3D reconstruction comprises multi-image 3D reconstruction.

21. The UAV of claim 14, wherein:
the software fusing comprises a mixture of Gaussian approach.

22. The UAV of claim 21, wherein:
the mixture of Gaussian approach is based on an uncertainty model that is within a threshold level of accuracy; and
the mixture of Gaussian approach decouples a fusion of single-layer measurements and updating other layers of the multi-resolution height map by a pooling operation.

23. The UAV of claim 14, wherein:
the multi-resolution height map is anchored within a global frame;
the multi-resolution height map travels with the UAV; and
image data from the selected multiple images flows into and out of the multi-resolution height map using a rolling buffer.

24. The UAV of claim 14, wherein:
the multi-resolution height map is anchored and fixed within a global frame.

25. The UAV of claim 14, wherein the software detecting is based on:
surface roughness;
slope;
uncertainty; and
sufficient space for the UAV.

26. The UAV of claim 14, wherein the software detecting:
filters the multi-resolution height map to produce candidate safe landing areas using a filter that filters for different hazard categories; and
selects a landing point in a safe area by:
  producing a single resolution safe landing area map based on the candidate safe landing areas;
  applying a distance transform to identify a center of the candidate safe landing areas, from the safe landing area map, as candidate landing sites;
  selecting a final landing site from the candidate landing sites based on a size of the candidate safe landing area that surrounds each candidate landing site;
  improving the final landing site by shifting a location of the final landing site based on an estimated roughness of terrain around the final landing site.

* * * * *